(12) United States Patent
Martinez

(10) Patent No.: US 9,857,490 B2
(45) Date of Patent: Jan. 2, 2018

(54) METHODS AND SYSTEMS FOR OPTIMIZING GENERATION OF SEISMIC IMAGES

(71) Applicant: PGS Geophysical AS, Oslo (NO)

(72) Inventor: Ruben D. Martinez, Sugarland, TX (US)

(73) Assignee: PGS Geophysical AS, Oslo (NO)

( * ) Notice: Subject to any disclaimer, the term of this patent is extended or adjusted under 35 U.S.C. 154(b) by 411 days.

(21) Appl. No.: 14/332,850

(22) Filed: Jul. 16, 2014

(65) Prior Publication Data

US 2015/0185349 A1    Jul. 2, 2015

Related U.S. Application Data

(60) Provisional application No. 61/921,952, filed on Dec. 30, 2013.

(51) Int. Cl.
*G01V 1/36* (2006.01)

(52) U.S. Cl.
CPC ........ *G01V 1/362* (2013.01); *G01V 2210/322* (2013.01)

(58) Field of Classification Search
CPC .................................................. G01V 1/362
USPC ............................................................ 702/17
See application file for complete search history.

(56) References Cited

U.S. PATENT DOCUMENTS

| | | | |
|---|---|---|---|
| 3,398,396 A | 8/1968 | Embree | |
| 4,210,968 A * | 7/1980 | Lindseth | G01V 1/303 367/46 |
| 4,884,247 A * | 11/1989 | Hadidi | G01V 1/366 367/43 |
| H001693 H * | 11/1997 | Thornton | G01V 1/36 702/17 |
| 6,442,490 B1 * | 8/2002 | Li | G01V 1/28 702/18 |
| 6,535,818 B1 * | 3/2003 | Baeten | G01V 1/362 702/17 |
| 6,785,612 B1 | 8/2004 | Zhang | |
| 6,807,489 B2 * | 10/2004 | Naville et al. | G01V 1/42 702/17 |
| 6,856,911 B2 | 2/2005 | Wang et al. | |
| 7,039,526 B2 | 5/2006 | Kelly | |

(Continued)

FOREIGN PATENT DOCUMENTS

GB      2429526 A    2/2007

OTHER PUBLICATIONS

GB Search Report dated May 29, 2015, in the prosecution of application No. GB1422817.5, 3 pages.

(Continued)

*Primary Examiner* — Ricky Ngon

(57) ABSTRACT

This disclosure is directed to systems and methods for stacking seismic data. The methods receive seismic data collected from a survey of a subterranean formation. A gather of seismic data may have flattened reflection events obtained as a result of normal moveout ("NMO") corrections or pre-stack migration. Alternatively, the gather may be an unmigrated gather with non-horizontal reflection events. A smoothed-amplitude gather is generated from the gather. Traces of the gather are stacked to generate a trace with significantly reduced noise using corresponding smoothed amplitudes of the smoothed-amplitude gather as weights.

27 Claims, 19 Drawing Sheets

(56) References Cited

U.S. PATENT DOCUMENTS

| | | | |
|---|---|---|---|
| 7,336,560 | B2 | 2/2008 | Rekdal et al. |
| 7,388,808 | B2 | 6/2008 | Lee et al. |
| 7,733,741 | B2 | 6/2010 | Pan |
| 9,329,292 | B2 * | 5/2016 | Dellinger ............. G01V 1/3808 |
| 2004/0054479 | A1 * | 3/2004 | Trickett .................. G01V 1/36 702/14 |
| 2005/0237857 | A1 | 10/2005 | Jiao et al. |
| 2012/0243372 | A1 * | 9/2012 | Al-Dossary ............. G01V 1/28 367/43 |
| 2013/0308423 | A1 * | 11/2013 | Winter .................. G01V 1/362 367/38 |
| 2014/0241117 | A1 * | 8/2014 | Dellinger ............. G01V 1/3808 367/15 |
| 2016/0377755 | A1 * | 12/2016 | Etgen ..................... G01V 1/301 702/16 |

OTHER PUBLICATIONS

Martinez et al. "Validation of WAZ time processing and depth imaging optimization using reverse time migration (RTM)", 2013, SBGF.

Robinson, John C., "Statistically Optimal Stacking of Seismic Data," Geophysics, vol. 35, No. 3, Jun. 1970, pp. 436-446.

Anderson, Richard G., et al., "Weighted Stacking of Seismic Data using Amplitude-Decay Rates and Noise Amplitudes," Geophysical Prospecting 38, 1990, pp. 365-380.

Rietsch, E., "Estimation of the Signal-to-Noise Ratio of Seismic Data with an Application to Stacking," Geophysical Prospecting, 1980, pp. 531-550.

Grion, S., et al., "Stacking weights determination by means of SVD and cross-correlation," 1998, SEG Expanded Abstracts.

Neelamani, Ramesh, et al., "Stack-and-Denoise: A New Method to Stack Seismic Datasets," SEG/New Orleans 2006 Annual Meeting, pp. 2827-2831.

Mayne, W. Harry, "Common Reflection Point Horizontal Data Stacking Techniques," Geophysics, vol. XXVII, No. 6, Part II, Dec. 1962, pp. 927-938.

Trickett, Stewart, "Maximum-likelihood-estmation stacking," SEG/San Antonio 2007 Annual Meeting, pp. 2640-2643.

Tang, Yaxun et al., "Selective stacking in the reflection-angle and azimuth domain," SEG/San Antonio 2007 Annual Meeting, pp. 2320-2324.

Rashed, Mohamed A., et al. "Smart stacking: A new CMP stacking technique for seismic data," The Leading Edge, Apr. 2008, pp. 462-467.

Manning, T., et al., "Leveraging the Value of Multi-azimuth (MAZ) Seismic through MAZ-stack," 70th EAGE Conference & Exhibition, Rome, Italy Jun. 9-12, 2008.

Liu, Guochang, et al., "Stacking seismic data using local correlation," Geophysics, vol. 74, No. 3, May-Jun. 2009, pp. V43-V48.

* cited by examiner

METHODS AND SYSTEMS FOR OPTIMIZING GENERATION OF SEISMIC IMAGES

CROSS-REFERENCE TO RELATED APPLICATION

This application claims the benefit of Provisional Application No. 61/921,952, filed Dec. 30, 2013.

BACKGROUND

In recent years, the petroleum industry has invested heavily in the development of improved seismic survey techniques and seismic data processing methods in order to increase the resolution and accuracy of seismic images of subterranean formations. Seismic surveys illuminate a subterranean formation with sound waves produced by one or more seismic sources. As a sound wave travels down into the subterranean formation, at each interface between different types of rock or sediment a portion of the sound wave is refracted, a portion is transmitted, and a portion is reflected back toward the formation surface where seismic receivers positioned above the subterranean formation detect reflected wavefields. Subsurface illumination with acoustic impulses often depends on the survey acquisition geometry used to collect the seismic data and the selected seismic imaging technique. Different offset ranges in narrow-azimuth surveys and offset and azimuth ranges in wide-azimuth and full-azimuth surveys are used to create different illuminations of the subterranean formation.

Isotropic and anisotropic pre-stack imaging algorithms are often used to generate image gathers of a subterranean formation from the reflected wavefield data. Image gathers may be stacked in order to reduce noise in subsequently generated seismic images of the subterranean formation. However, many currently used stacking techniques, such as straight stacking, are not optimal for stacking image gathers of subterranean formations with deposits of materials that create anomalous changes in velocities of acoustic waves used to illuminate the subterranean formation. Examples of these deposits include salt domes, mobile shales, carbonates, and/or basalt bodies. Acoustic illumination of a subterranean formation with these types of deposits often results in seismic images with gaps or zones of poor image quality below or within the deposits. As a result, identifying a hydrocarbon reservoir located below these deposits in seismic images generated by typical seismic data processing techniques remains a challenge. Those working in petroleum exploration and seismic data processing continue to seek systems and methods for improving seismic image quality of subterranean formations that have a wide variety of deposits and irregular-shaped formations.

DETAILED DESCRIPTION

This disclosure is directed to systems and methods for stacking seismic data. The methods receive seismic data collected from a survey of a subterranean formation. A gather of seismic data may have flattened reflection events obtained as a result of pre-stack migration or with normal moveout ("NMO") corrections. Alternatively, the gather may be an unmigrated gather with non-horizontal reflection events. A smoothed-amplitude gather may be generated from the gather. Traces of the gather may be stacked to generate a trace with significantly reduced noise using corresponding smoothed amplitudes of the smoothed-amplitude gather as weights. The stacking method is called self-weighting stacking ("SWS"). The SWS methods described below may replace typical stacking techniques in seismic data methods used to generated seismic images of subterranean formations. SWS is a fully automatic stacking technique in that user intervention or control is not required, SWS does not require any a priori information about the magnitude distribution of trace amplitudes of the image gather traces, and does not require a priori computation of model traces or thresholds. In particular, SWS may be used to improve the quality of seismic images of subterranean formations with deposits of materials that typically create anomalous changes in velocities of acoustic waves used to illuminate subterranean formations and previously obscured seismic images.

Figure 1A:
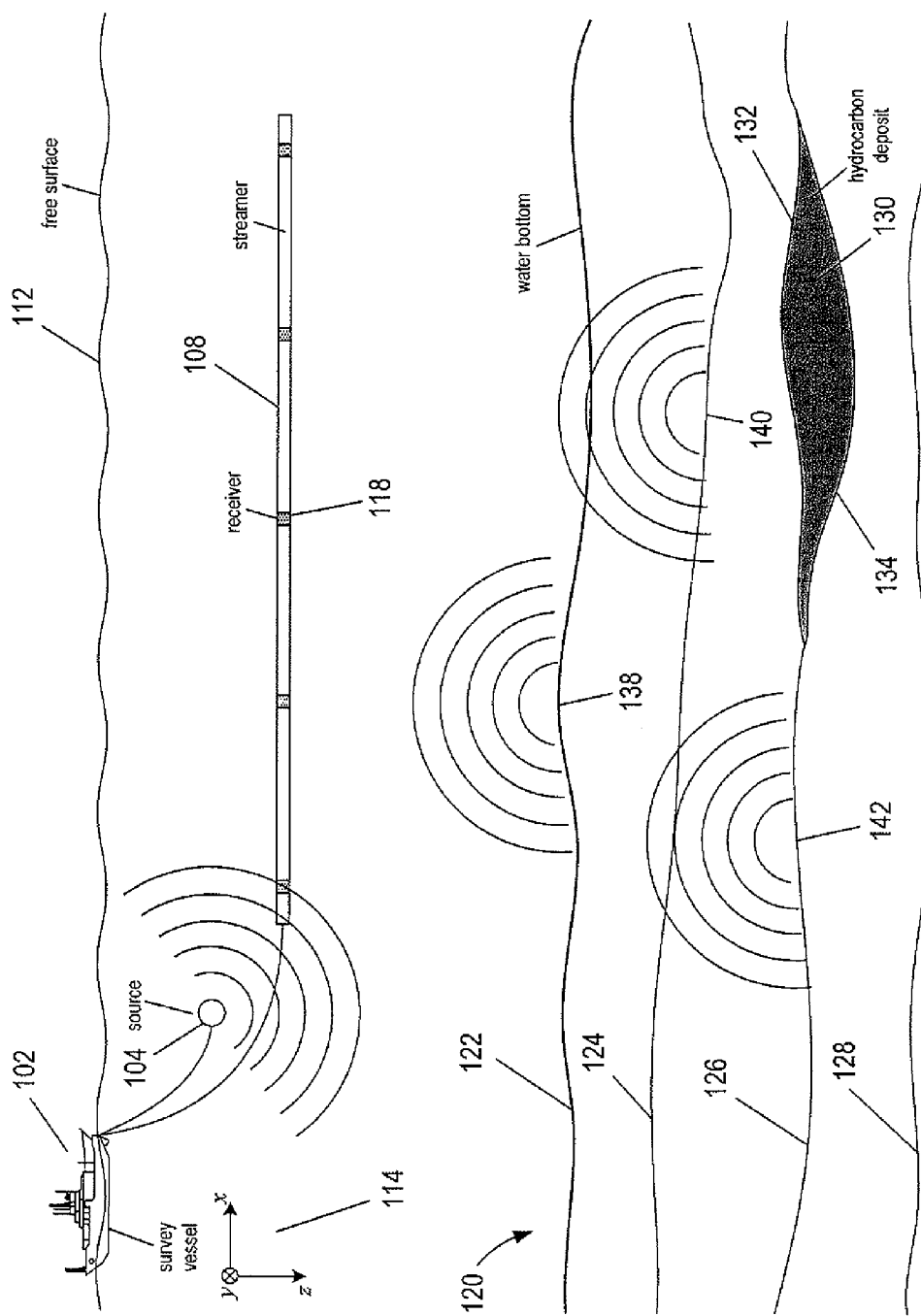
FIGS. 1A-1B show side-elevation and top views of an example marine seismic data acquisition system.
Figure 1B:
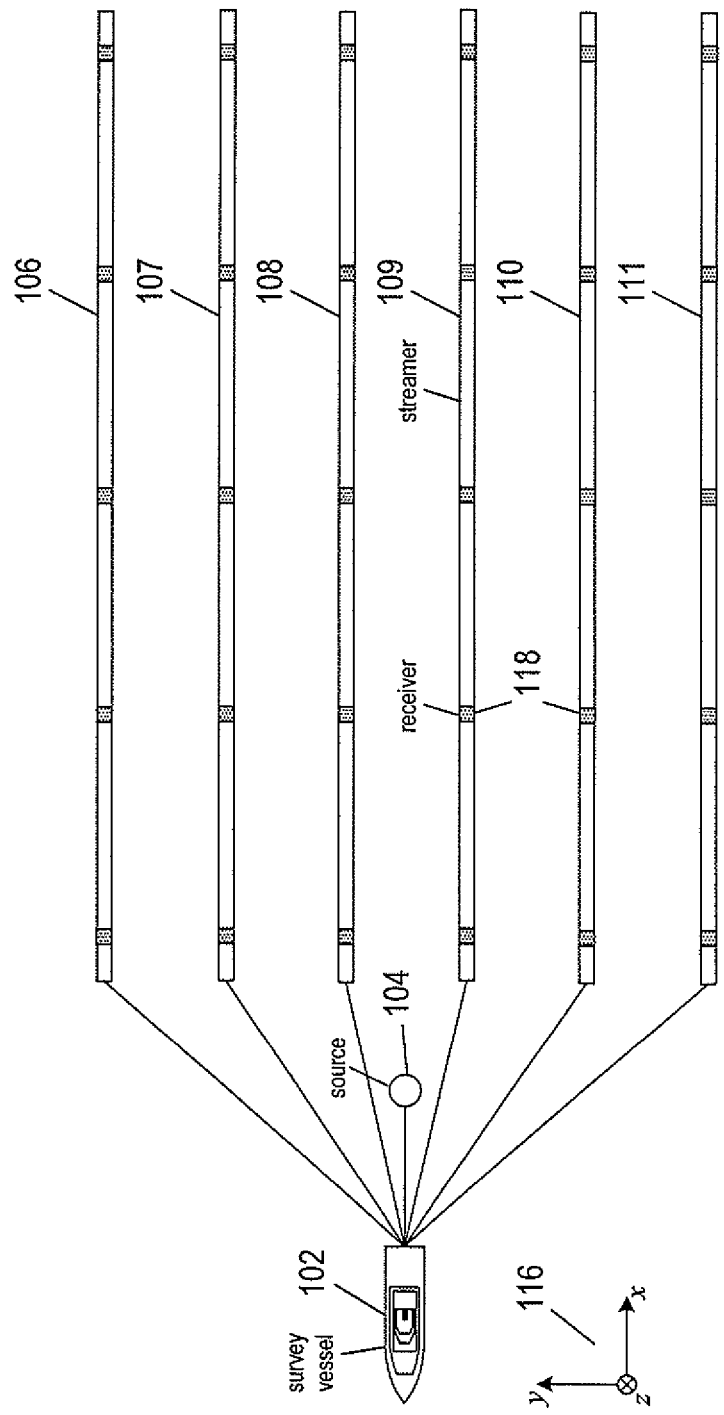

Systems and methods for stacking seismic data may be applied to seismic data obtained from marine or land surveys of subterranean formations. Consider first the marine survey. FIGS. 1A-1B show side-elevation and top views, respectively, of an example seismic data acquisition system composed of an survey vessel 102 towing a source 104 and six separate streamers 106-111 beneath a free surface 112 of a body of water. The body of water can be, for example, an ocean, a sea, a lake, or a river, or any portion thereof. In this example, each streamer is attached at one end to the survey vessel 102 via a streamer-data-transmission cable. The illustrated streamers 106-111 form a planar horizontal data acquisition surface with respect to the free surface 112. However, in practice, the data acquisition surface may be smoothly varying due to active sea currents and weather conditions. In other words, although the streamers 106-111 are illustrated in FIGS. 1A and 1B and subsequent figures as straight and substantially parallel to the free surface 112, in practice, the towed streamers may undulate as a result of dynamic conditions of the body of water in which the streamers are submerged. A data acquisition surface is not limited to having a planar horizontal orientation with respect to the free surface 112. The streamers may be towed at depths that angle the data acquisition surface with respect to the free surface 112 or one or more of the streamers may be towed at different depths. A data acquisition surface is not limited to six streamers as shown in FIG. 1B. In practice, the number of streamers used to form a data acquisition surface can range from as few as one streamer to as many as 20 or more streamers. It should also be noted that the number of sources is not limited to a single source. In practice, the number of sources selected to generate acoustic energy may range from as few as one source to three or more sources and the sources may be towed in groups by one or more vessels.

FIG. 1A includes an xz-plane 114 and FIG. 1B includes an xy-plane 116 of the same Cartesian coordinate system having three orthogonal, spatial coordinate axes labeled x, y and z. The coordinate system is used to specify orientations and coordinate locations within the body of water. The x-direction specifies the position of a point in a direction parallel to the length of the streamers (or a specified portion thereof when the length of the streamers are curved) and is referred to as the "in-line" direction. The y-direction specifies the position of a point in a direction perpendicular to the x-axis and substantially parallel to the free surface 112 and is referred to as the "cross-line" direction. The z-direction specifies the position of a point perpendicular to the xy-plane (i.e., perpendicular to the free surface 112) with the positive z-direction pointing downward away from the free surface 112. The streamers 106-111 are long cables containing power and data-transmission lines that connect receivers represented by shaded rectangles 118 spaced-apart along the length of each streamer to seismic data acquisition equipment and data-storages devices located on board the survey vessel 102.

Streamer depth below the free surface 112 can be estimated at various locations along the streamers using depth measuring devices attached to the streamers. For example, the depth measuring devices can measure hydrostatic pressure or utilize acoustic distance measurements. The depth measuring devices can be integrated with depth controllers, such as paravanes or water kites that control and maintain the depth and position of the streamers as the streamers are towed through the body of water. The depth measuring devices are typically placed at intervals (e.g., about 300 meter intervals in some implementations) along each streamer. Note that in other implementations buoys may be attached to the streamers and used to help maintain the orientation and depth of the streamers below the free surface 112.

FIG. 1A shows a cross-sectional view of the survey vessel 102 towing the source 104 above a subterranean formation 120. Curve 122 represents a top surface of the subterranean formation 120 located at the bottom of the body of water. The subterranean formation 120 is composed of a number of subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine seismic survey. As the survey vessel 102 moves over the subterranean formation 120, the source 104 is activated to produce an acoustic signal (often referred to as a "shot") at spatial and/or temporal intervals. In other implementations, the source 104 may be towed by one survey vessel and the streamers may be towed by a different survey vessel. The source 104 may be an air gun, marine vibrator, or composed of an array of air guns and/or marine vibrators. FIG. 1A illustrates an acoustic signal expanding outward from the source 104 as a pressure wavefield 136 represented by semicircles of increasing radius centered at the source 104. The outwardly expanding wavefronts from the sources may be spherical but are shown in vertical plane cross section in FIG. 1A. The outward and downward expanding portion of the pressure wavefield 136 is called the "primary wavefield," which eventually reaches the formation surface 122 of the subterranean formation 120, at which point the primary wavefield is partially reflected from the formation surface 122 and partially refracted downward into the subterranean formation 120, becoming elastic waves within the subterranean formation 120. In other words, in the body of water, the acoustic signal is composed of compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves are partially reflected and partially refracted. As a result, each point of the formation surface 122 and each point of the interfaces 124, 126, and 128 is a reflector that becomes a potential secondary point source from which acoustic and elastic wave energy, respectively, may emanate upward toward the receivers 118 in response to the acoustic signal generated by the source 104 and downward-propagating elastic waves generated from the pressure impulse. As shown in FIG. 1A, secondary waves of significant amplitude may be generally emitted from points on or close to the surface 122, such as point 138, and from points on or very close to interfaces in the subterranean formation 120, such as points 140 and 142.

The secondary waves may be generally emitted at different times within a range of times following the initial acoustic signal. A point on the formation surface 122, such as the point 138, may receive a pressure disturbance from the primary wavefield more quickly than a point within the subterranean formation 120, such as points 140 and 142. Similarly, a point on the formation surface 122 directly beneath the source 104 may receive the pressure disturbance sooner than a more distant-lying point on the formation surface 122. Thus, the times at which secondary and higher-order waves are emitted from various points within the subterranean formation 120 may be related to the distance, in three-dimensional space, of the points from the activated source.

Acoustic and elastic waves, however, may travel at different velocities within different materials as well as within the same material under different pressures. Therefore, the travel times of the primary wavefield and secondary wavefield emitted in response to the primary wavefield may be functions of distance from the source 104 as well as the materials and physical characteristics of the materials through which the wavefields travel. In addition, the secondary expanding wavefronts may be altered as the wavefronts cross interfaces and as the velocity of sound varies in the media are traversed by the wave. The superposition of waves emitted from within the subterranean formation 120 in response to the primary wavefield may be a generally complicated wavefield that includes information about the shapes, sizes, and material characteristics of the subterranean formation 120, including information about the shapes, sizes, and locations of the various reflecting features within the subterranean formation 120 of interest to exploration geophysicists.

Figure 2:
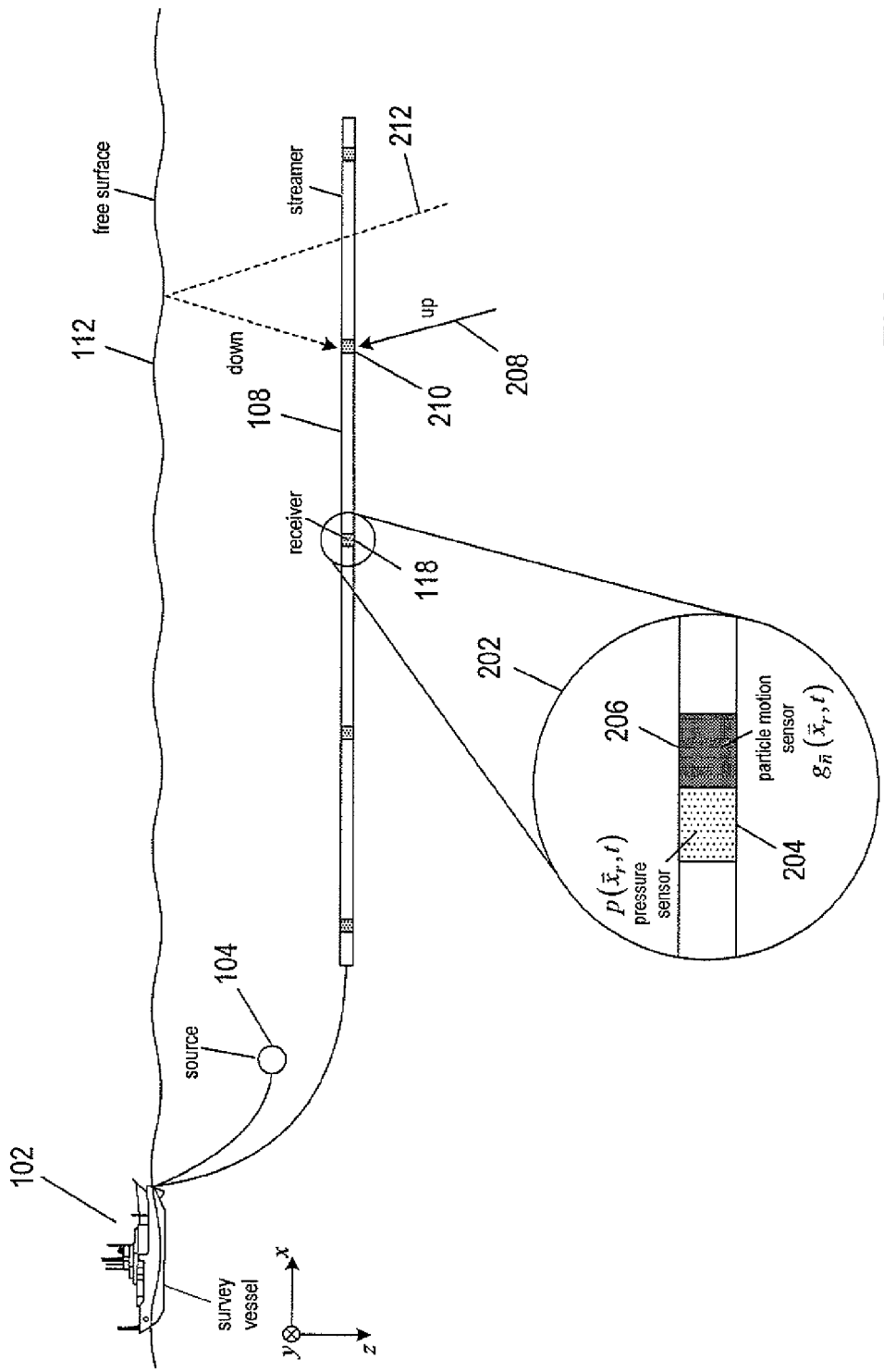
FIG. 2 shows a side-elevation view of marine seismic data acquisition system with a magnified view of a receiver.

Each receiver 118 may include a particle motion sensor that detects particle motion, velocities, or accelerations over time, a pressure sensor that detects variations in water pressure over time, or a combination of particle motion and pressure sensors. FIG. 2 shows a side-elevation view of the marine seismic data acquisition system with a magnified view 202 of the receiver 118. In this example, the magnified view 202 reveals that the receiver 118 is a dual sensor composed of a pressure sensor 204 and a particle motion sensor 206. The pressure sensor may be, for example, a hydrophone. Each pressure sensor measures changes in hydrostatic pressure over time and produces pressure data denoted by $p(\vec{x},t)$, where $\vec{x}$ represents the Cartesian coordinates (x,y,z) of the receiver, and t represents time. The particle motion sensors may be responsive to water motion. In general, particle motion sensors detect particle motion in a direction normal to the orientation of the particle motion sensor and may be responsive to such directional displacement of the particles, velocity of the particles, or acceleration of the particles. The particle motion sensor data produced by the particle motion sensors may be converted to particle motion velocity data. For example, when particle motion sensors that are responsive to position are used, the particle motion sensor data denoted by $g_{\vec{n}}(\vec{x},t)$ may be differentiated to convert the data to particle motion velocity data denoted by $v_{\vec{n}}(\vec{x},t)$, where unit normal vector $\vec{n}$ points in the direction particle motion is measured. Likewise, when particle motion sensors that are responsive to acceleration (i.e., accelerometers) are used, the particle acceleration data denoted by $a_{\vec{n}}(\vec{x},t)$ may be integrated to convert the data to particle motion velocity data $v_{\vec{n}}(\vec{x},t)$. The particle motion sensors are typically oriented so that the particle motion is measured in the vertical direction (i.e., $\vec{n}=(0,0,z)$) in which case $v_z(\vec{x},t)$ is called the vertical velocity data. Alternatively, each receiver may include two additional particle motion sensors that measure particle motion in two other directions, $\vec{n}_1$ and $\vec{n}_2$, that are orthogonal to $\vec{n}$ (i.e., $\vec{n}\cdot\vec{n}_1=\vec{n}\cdot\vec{n}_2=0$, where "·" is the scalar product) and orthogonal to one another (i.e., $\vec{n}_1\cdot\vec{n}_2=0$). In other words, each receiver may include three particle motion sensors that measure particle motion in three orthogonal directions. For example, in addition to having a particle motion sensor that measures particle motion in the z-direction to give $v_z(\vec{x},t)$, each receiver may include a particle motion sensor that measures the wavefield in the in-line direction in order to obtain the inline velocity wavefield, $v_x(\vec{x},t)$, and a particle motion sensor that measures the wavefield in the cross-line direction in order to obtain the cross-line velocity wavefield, $v_y(\vec{x},t)$. In certain implementations, the receivers may by composed of only pressure sensors, and in other implementations, the receivers may be composed of only particle motion sensors.

Seismic data includes the data generated by the receivers when detecting acoustic energy, for example pressure and particle motion data. The streamers 106-111 and the survey vessel 102 may include sensing electronics and data-processing facilities that allow seismic data generated by each receiver to be correlated with the time and location of each source activation, absolute positions on the free surface 112, and absolute three-dimensional positions with respect to an arbitrary three-dimensional coordinate system. The pressure data and particle motion data may be stored at the receivers and/or may be sent along the streamers and data transmission cables to the survey vessel 102, where the data may be stored electronically or magnetically on data-storage devices located onboard the survey vessel 102. The pressure data and particle motion data represent pressure and particle motion wavefields and, therefore, may also be referred to as the pressure wavefield and particle motion wavefield, respectively.

In FIG. 2, directional arrow 208 represents the direction of an up-going wavefield at the location of receiver 210 and dashed arrow 212 represents a down-going wavefield produced by an up-going wavefield reflection from the free surface 112 before reaching the receiver 210. In other words, the pressure wavefield $p(\vec{x},t)$ is composed of an up-going pressure wavefield component and a down-going pressure wavefield component, and the particle motion wavefield $g_{\vec{n}}(\vec{x},t)$ is composed of an up-going wavefield component and a down-going wavefield component. The down-going wavefield contaminates pressure and particle motion data and creates notches in the seismic data spectral domain. Filtering may be done to remove the down-going wavefields from the pressure and particle motion data, leaving the up-going wavefields which are typically used to analyze the subterranean formation.

Figure 3A:
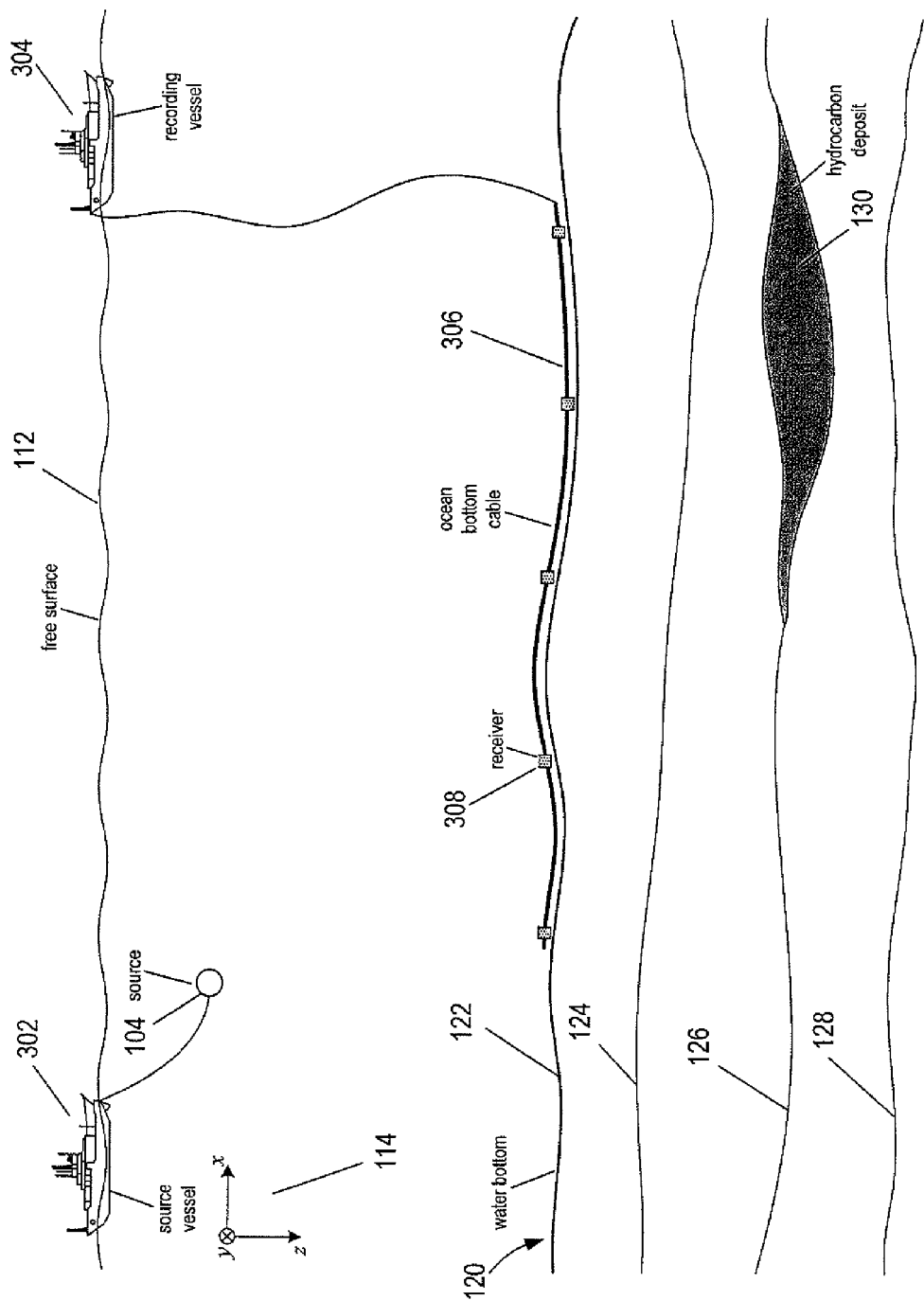
FIG. 3A shows a side-elevation view of an example ocean bottom cable-based seismic data acquisition system.

Implementations are not intended to be limited to marine surveys executed with towed streamers as described above. The systems and methods described below may also be applied to seismic data produced by ocean bottom seismic techniques. One example of these techniques is implemented with ocean bottom cables ("OBCs") as shown in FIG. 3A. FIG. 3A shows an example of a marine survey conducted with a source vessel 302 and a recording vessel 304 electronically connected to an OBC 306. In practice, the recording vessel 304 may be connected to any number of OBCs. The OBCs are similar to the towed streamer cables described above in that the OBCs include a number of spaced-apart receivers, such as receiver 308, deployed approximately every 25 to 50 meters, but the OBCs are laid on or near the formation surface 120. As shown in the example of FIG. 3A, the source vessel 104 operates the source 104 as described above and the recording vessel 304 provides power, instrument command and control, and recordation of the seismic data produced by receivers using recording equipment located on board the recording vessel.

Alternatively, ocean bottom seismic techniques can be implemented with autonomous systems composed of receivers. For example, the receivers may be deployed and recovered using remote operated vehicles. The receivers may be placed on or near the formation surface 122 in a fairly coarse grid, such as approximately 400 meters apart. Autonomous receiver systems are typically implemented using one of two types of receiver systems. A first receiver system is a cable system in which the receivers are connected by cables to each other and are connected to an anchored recording vessel. The cabled systems have power supplied to each receiver along a cable, and seismic data are returned to the recording vessel along the cable or using radio telemetry. A second receiver system uses self-contained receivers that have a limited power supply, but the receivers typically have to be retrieved in order to download recorded seismic data. Whether using OBCs or autonomous receivers, source vessels equipped with two or more sources are operated as described above with reference to FIGS. 1A and 1B to generate acoustic signals at substantially the same location.

Figure 3B:
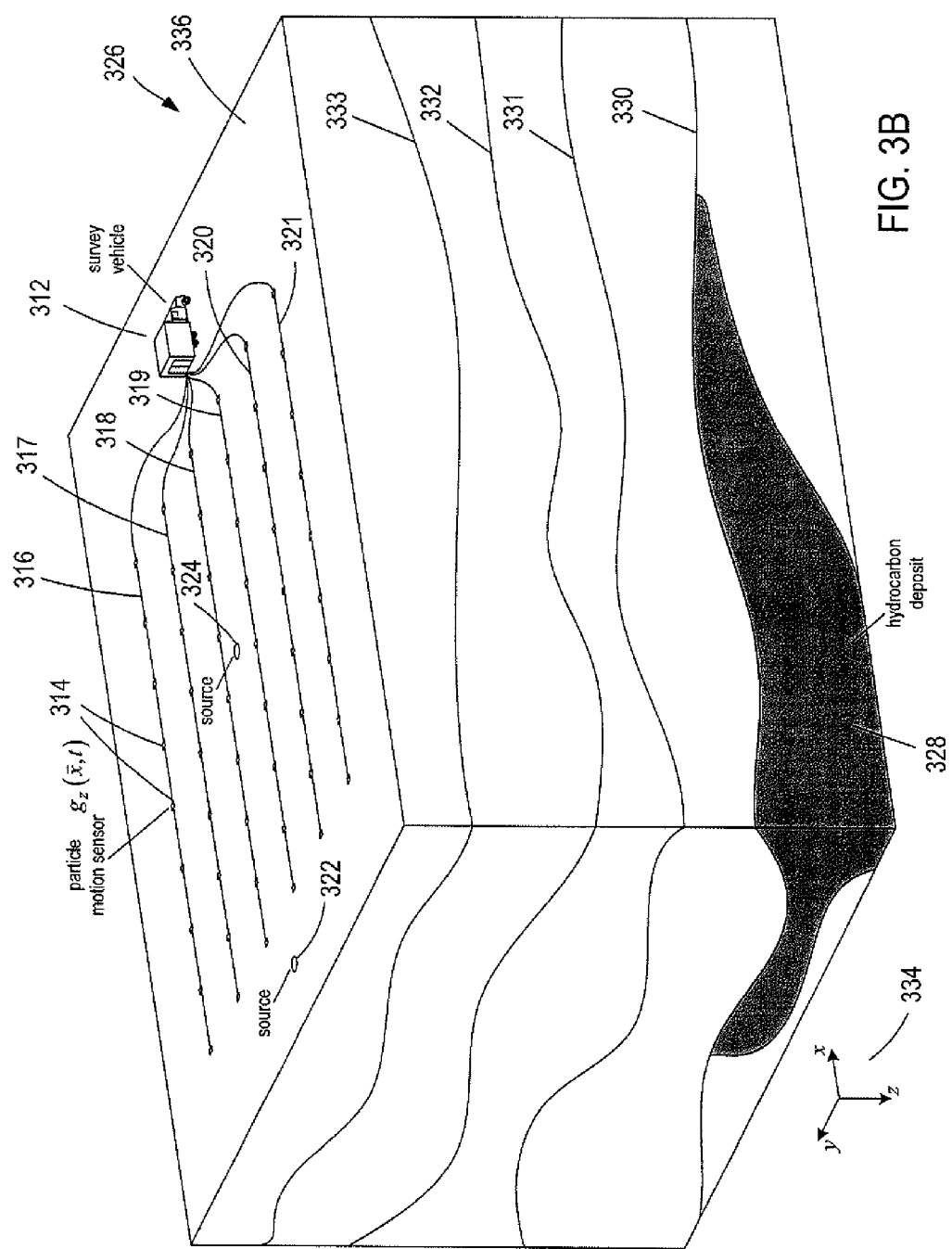
FIG. 3B shows an isometric view of an example land-based seismic data acquisition system.

For land surveys, particle motion sensors are typically deployed at fixed locations on the surface of a subterranean formation and one or more sources may be activated at different locations. FIG. 3B shows an isometric view of an example seismic data acquisition system composed of a survey vehicle 312, particle motion sensors, such as particle motion sensors 314, located along data transmission cables 316-321 that lead to the survey vehicle 312, and two sources 322 and 324. Block 326 represents a volume of a subterranean formation that includes a hydrocarbon deposit 328 located beneath layers of sediment and rock separated by interfaces 330-333. The locations of the sources 322 and 324 and particle motion sensors may be given with reference to a Cartesian coordinates system 334. Examples of sources 322 and 324 may include explosives, vibrators, or thumper trucks, and may be located on formation surface 336 or in boreholes. The particle motion sensors 304 may be geophones placed at grid points on the subterranean formation surface 326 to detect particle motion in the z-direction denoted by $g_z(\vec{x},t)$. The sources 322 and 324 are activated to generate acoustic energy that travels down into the subterranean formation 326 to produce reflected seismic wavefields that are detected by the particle motion sensors 314 as described above. The particle motion data may be stored at the receivers and/or may be sent along the data transmission cables to the survey vehicle 312, where the data may be stored electronically or magnetically on data-storage devices located in the survey vehicle 312.

Each receiver generates seismic data that may be stored in data-storage devices. The seismic data measured by each receiver is a time series that consist of a number of consecutively measured values, called amplitudes, separated in time by a sample rate. The time series measured by a receiver is called a "trace," which may consist of thousands of samples collected at a sample rate of about 1 to 5 ms. A trace is a record of a subterranean formation response to acoustic energy that passes from an activated source, into the subterranean formation where the reflected acoustic energy is detected by a receiver as described above. A trace records variations in a time-dependent amplitude that represents acoustic energy in the portion of the secondary wavefield measured by the receiver. In other words, each trace is a set of time-dependent receiver amplitudes:

$$tr(i)=\{a_i(t_j)\}_{j=1}^{M} \qquad (1)$$

where i is a positive integer trace, receiver, or sensor index;

j is a sample index;

M is the number of samples; and $a_i(t_j)$ is the amplitude of the ith trace at time sample $t_j$.

As explained above, the secondary wavefield typically arrives first at the receivers located closest to the sources. The distance from the sources to a receiver is called the "source-receiver offset," or simply "offset," which creates a delay in the arrival time of a secondary wavefield from a substantially horizontal interface within the subterranean formation. A larger offset generally results in a longer arrival time delay. The traces are collected to form a "gather" that can be further processed using various seismic computational processing techniques in order to obtain information about the structure of the subterranean formation.

Figure 4:
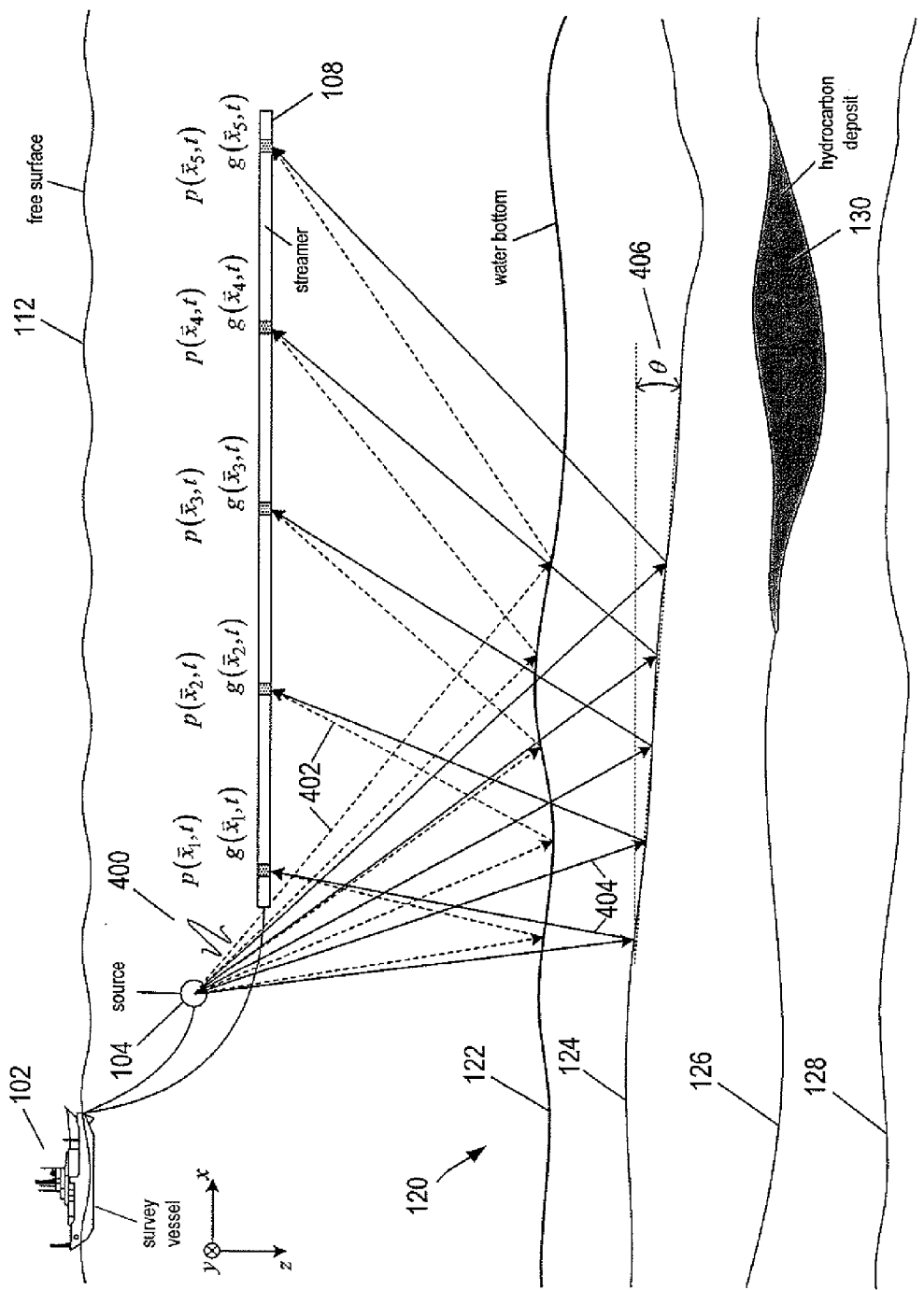
FIG. 4 shows an example of acoustic energy ray paths emanating from a source.

FIG. 4 shows example ray paths that represent paths of an acoustic signal 400 that travels from the source 104 into the subterranean formation 120. Dashed-line rays, such as rays 402, represent acoustic energy reflected from the formation surface 122 to the receivers located along the streamer 108, and solid-line rays, such as rays 404, represent acoustic energy reflected from the interface 124 to the receivers located along the streamer 108. Note that for simplicity of illustration only a handful of ray paths are represented, and ray paths that extend to deeper interfaces are not shown. Each pressure sensor measures the hydrostatic pressure and each particle motion sensor measures particle motion of the acoustic energy reflected from the formation 120. The hydrostatic pressure data and/or particle motion data generated at each receiver are time sampled and recorded as separate traces. In the example of FIG. 4, the collection of traces generated by the receivers along the streamer 108 for a single activation of the source 104 are collected to form a "common-shot gather" or simply a "shot gather." The traces generated by the receivers located along each of the other five streamers for the same activation may be collected to form separate shot gathers, each gather associated with one of the streamers.

Figure 5:
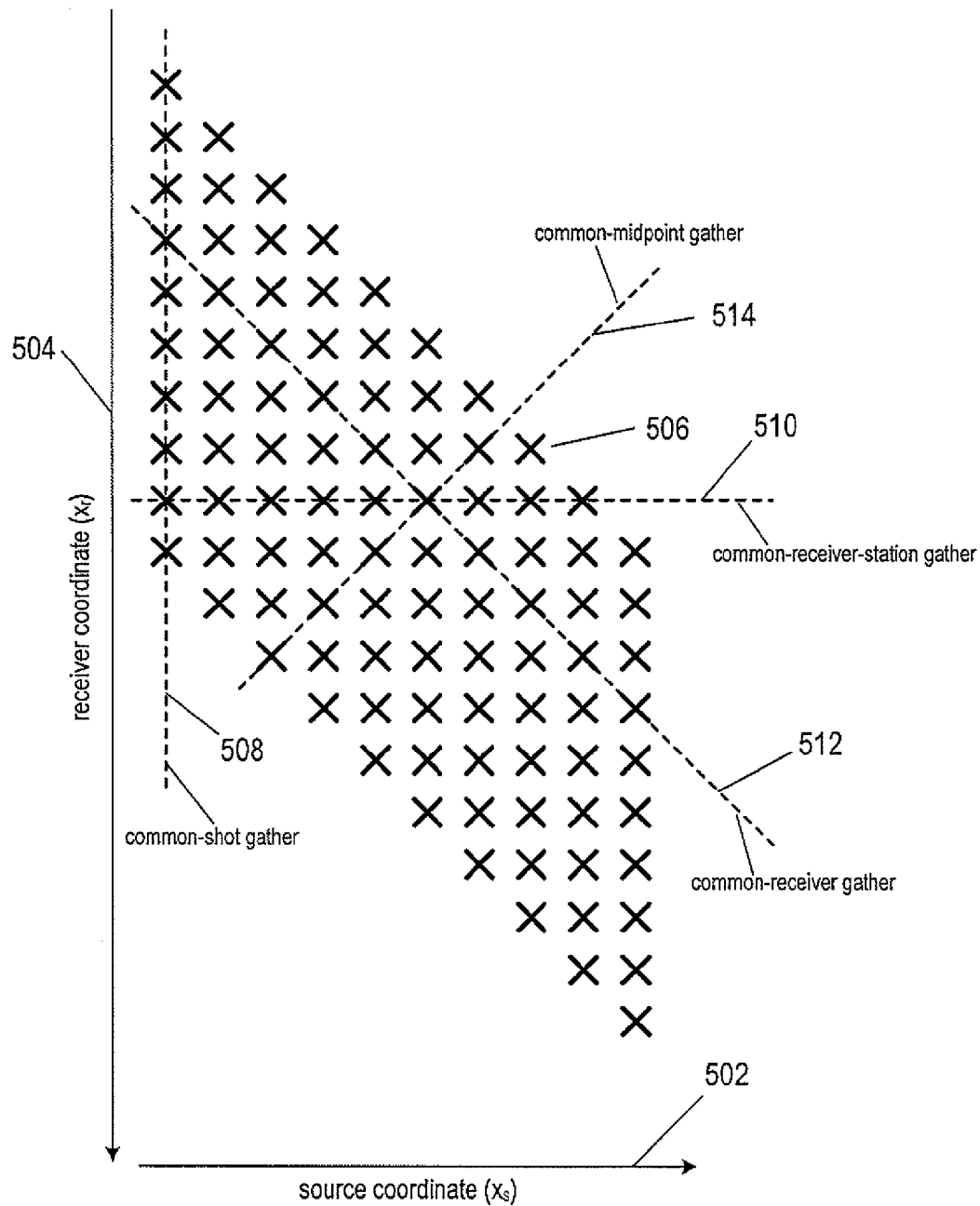
FIG. 5 shows a plot of different ways seismic data collected in a survey may be sorted into domains.

FIG. 5 shows a plot of different ways seismic data collected in a survey may be sorted into domains. Vertical axis 502 represents the in-line receiver coordinates and horizontal axis 504 represents the in-line source coordinates. X's, such as X 506, represent where a measurement (i.e., pressure or particle motion) has taken place. In this plot, a column of recordings identified by dashed line 508 represents a common-shot gather, and a row of recordings identified by dashed line 510 represents a common-receiver-station gather. Recordings collected along a diagonal represented by dashed line 512 is a common-receiver gather and recordings collected along a diagonal represented by dashed line 514 is a common-midpoint ("CMP") gather. The CMP is the point on the formation surface halfway between the location of the source and the receiver and is the same for a number of source-receiver pairs. This redundancy of source-receiver pairs often increases the quality of stacked seismic data. The CMP is not to be confused with common depth points that are located directly below the CMP at interfaces within the subterranean formation. The gathers form different domains. For example, the common-shot gathers form a common-shot domain, the common-receiver gathers form a common-receiver domain, the common-receiver-station gathers form a common-receiver-station domain, and the CMP gathers form a CMP domain. Certain domains are orthogonal. For example, as shown in FIG. 5, gathers in the common-shot domain are orthogonal to gathers in the common-receiver domain.

Figure 6:
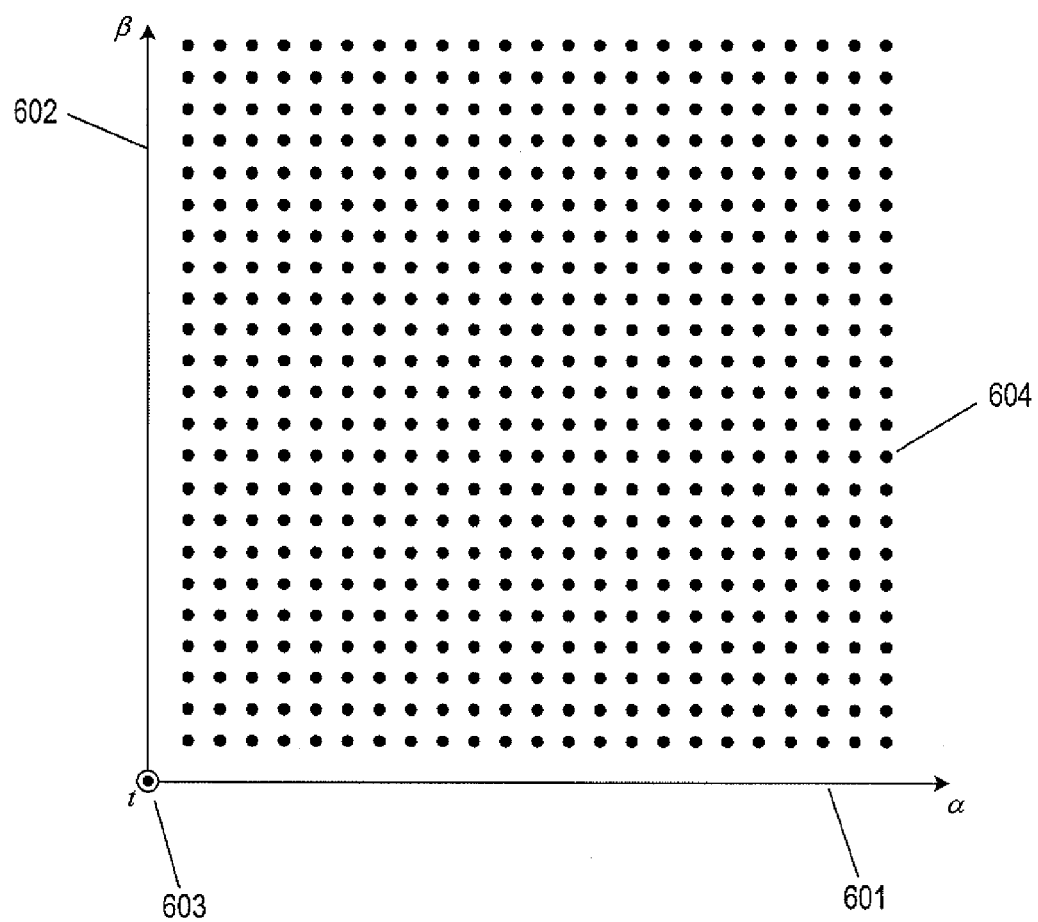
FIG. 6 shows an example of a general spatial domain for seismic data.

FIG. 6 shows an example of a general spatial domain for a seismic data gather. Horizontal axis 601 represents a first spatial coordinate α, vertical axis 602 represents second spatial coordinate β, and an axis 603 extending perpendicular to the αβ-plane represents time t. Dots, such as dot 604, represent spatial coordinates (α,β) of a seismic data gather or gather of traces. The spatial coordinates α and β are a general representation of one of many different seismic data gather domains. For example, the spatial coordinates α and β may represent x and y offset coordinates in an unmigrated data domain such as a common-shot gather, CMP, common-receiver gather, common-offset gather, or in an imaged data domain, such as incidence angle gather, azimuth gather, or surface offset gather. The traces may be raw or unprocessed seismic data measured by the receivers of the data acquisition surface. Alternatively, one or more seismic data processing techniques may have been applied to the seismic data. For example, the seismic data may have been debubbled, denoised, undergone regularization, or may have been demultipled. However, the traces typically contain noise or other artifacts that are not reduced using these techniques.

Figure 7:
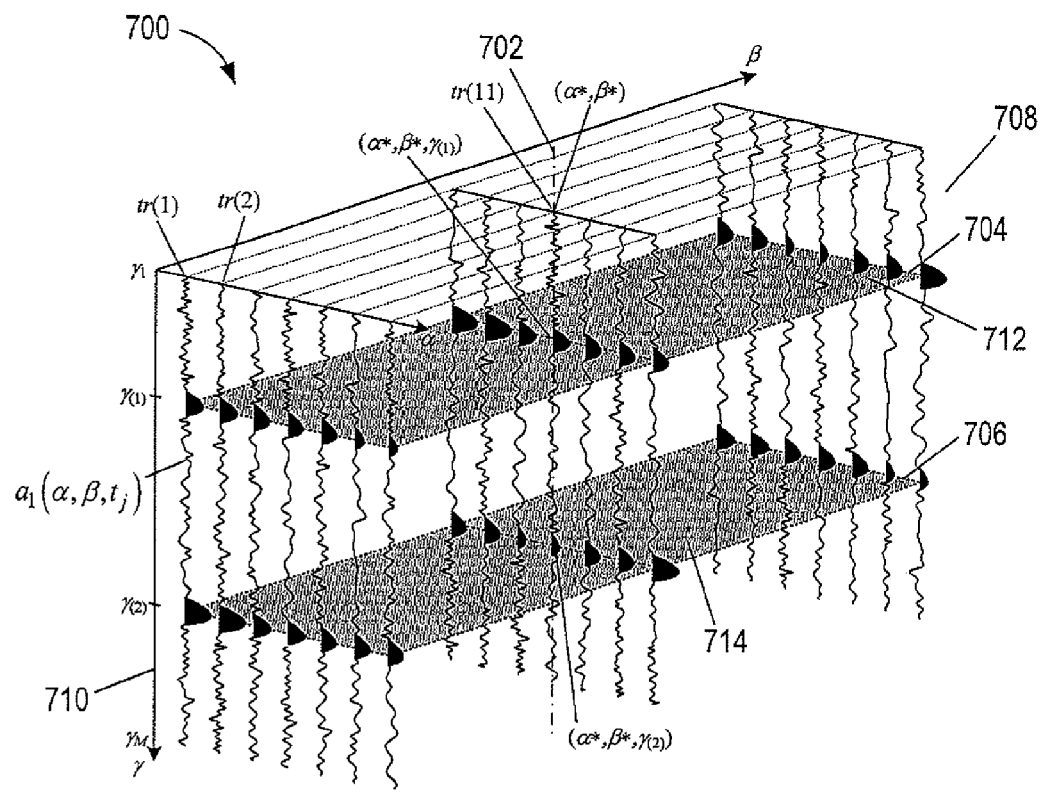
FIG. 7 shows an example of an image gather produced from the gather shown in FIG. 6.

FIG. 7 shows an example of a gather 700 of twenty-one traces with flattened reflection events. The gather 700 may be a common-image gather produced by applying pre-stack migration. Examples of pre-stack migration techniques that may be used to generate the gather 700 include Kirchhoff migration, reverse-time migration, wavefield-extrapolation migration, and reverse-time migration. Residual normal moveout ("NMO") may also be applied after pre-stack migration to further flatten reflection events. Depending on the domain selected for pre-stack migration, the gather 700 may be an offset-dependent common-image gathers ("OD-CIGs"), incidence angle-dependent common-image gathers ("ADCIGs"), and azimuth-sectored common-image gathers ("ASCIG"). The gather 700 may also be a CMP gather with varying offset or azimuth generated after application of NMO corrections to flatten reflection events. Coordinates $(\alpha^*, \beta^*)$ represent central coordinates of the gather 700 and correspond to a central axis 702 of the gather 700. In this particular example, the central coordinates $(\alpha^*, \beta^*)$ correspond to spatial coordinates of the $11^{th}$ trace tr(11). Each trace represents an amplitude variation in either pressure data or particle motion data measured by a receiver as described above with reference to Equation (1). Black-shaded wavelets correspond to acoustic reflections from a water bottom or interfaces of a subterranean formation. For example, wavelets located along a first dotted curve 704 represent reflections from the water bottom or a first interface and wavelets located along a second dotted curve 706 represent reflections from a second interface located deeper within the same subterranean formation. The wavelets located along the curves are called "reflections," "reflected waves," or "reflectors." The traces also include non-periodic amplitude fluctuations 708 called "noise." The pre-stack migration technique selected may be time, t, or depth, z. A parameter γ represents the time t or depth z component of the gather 700 and is represented by γ-axis 710. In this example, pre-stack migration flattens reflectors into substantially parallel horizontal reflector planes 712 and 714 with sample coordinates $\gamma_{(1)}$ and $\gamma_{(2)}$, respectively.

Figure 8:
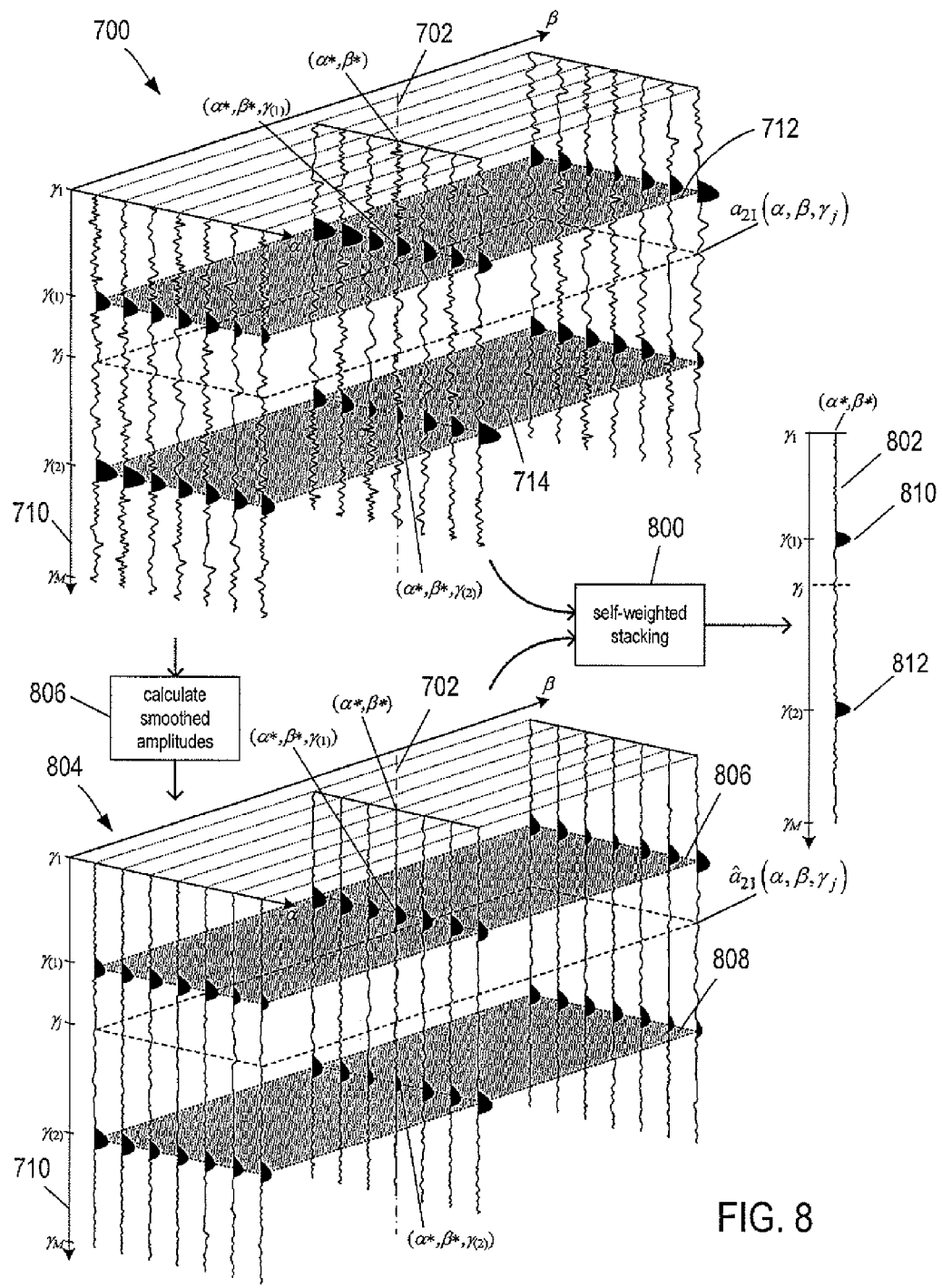
FIG. 8 shows an example of applying self-weighted stacking to an image gather with horizontal reflectors.

FIG. 8 shows an example of applying SWS 800 to the gather 700 to generate a single noise-reduced trace 802 with central coordinates $(\alpha^*, \beta^*)$. Prior to applying SWS 800, a smoothed-gather 804 is calculated 806 from the gather 700, as described in greater detailed below with reference to FIGS. 9A-9C. The smoothed amplitudes of the smoothed gather 804 are denoted by $\hat{a}_i(\alpha, \beta, \gamma_j)$, and each smoothed gather amplitude $\hat{a}_i(\alpha, \beta, \gamma_j)$ corresponds to an amplitudes $a_i(\alpha, \beta, \gamma_j)$ of the gather 700. For example, amplitude $a_{21}(\alpha, \beta, \gamma_j)$ in the gather 700 corresponds to smoothed amplitude $\hat{a}_{21}(\alpha, \beta, \gamma_j)$ in smoothed-gather 804. The smoothed-gather 804 includes horizontal reflector planes 806 and 808 that correspond to the horizontal reflector planes 712 and 714 of the gather 700 located at the same sample coordinates $\gamma_{(1)}$ and $\gamma_{(2)}$, respectively. As shown in FIG. 8, SWS 800 receives the gather 700 and the smoothed-gather 804 as input, and outputs the noise-reduced trace 802 with the same central coordinates $(\alpha^*, \beta^*)$ as the central coordinates $(\alpha^*, \beta^*)$ of the gather 700.

SWS may be applied to a gather with horizontal reflector planes as follows. Amplitudes for each sample coordinate $\gamma_j$ of a resulting noise-reduced trace are calculated according to horizontal SWS given by:

$$a_{SWS\_h}(\alpha, \beta, \gamma_j) = \frac{\sum_{i=1}^{N} \hat{a}_i^n(\alpha, \beta, \gamma_j) \cdot a_i(\alpha, \beta, \gamma_j)}{\sum_{i=1}^{N} \hat{a}_i^n(\alpha, \beta, \gamma_j)} \quad (2)$$

where n is a user selected number greater than or equal to 1; and

N is the number of traces in the gather.

In other words, an amplitude of a noise-reduced trace is calculated as a sum of each amplitude $a_i(\alpha, \beta, \gamma_j)$ of the gather multiplied by a corresponding smoothed-amplitude gather amplitude $\hat{a}_i^n(\alpha, \beta, \gamma_j)$ raised to the power n, and the sum is divided by a sum of smoothed-amplitude gather amplitudes raised to the power n.

In the example of FIG. 8, the number of traces in the gather 700 and in smoothed-gather 802 is 21 (i.e., N=21). The smoothed-amplitude exponent n is selected by a user. For example, a suitable value for the smoothed-amplitude exponent n may be 2. The noise-reduced trace 802 includes two wavelets 810 and 812 centered at sample coordinates $\gamma_{(1)}$ and $\gamma_{(2)}$, respectively, which correspond to the sample coordinates of the horizontal reflector planes 704 and 706.

A smoothed-amplitude gather, such as the smoothed-amplitude gather 804, may be calculated from a gather using a sliding window and a weight function applied to trace amplitudes that fall within the sliding window. The sliding window is incrementally centered at each sample coordinate $\gamma_j$ for j equal to 1 to M and encompasses amplitudes of the N traces in the gather between $\gamma_{j-K} \leq \gamma_j \leq \gamma_{j+K}$, where K is a user selected positive integer with K<M. When the sliding window is centered at sample coordinate $\gamma_j$, a smoothed amplitude is calculated for each trace i from 1 to N according to:

$$\hat{a}_i(\alpha, \beta, \gamma_j) = \sum_{k=-K}^{K} a_i(\alpha, \beta, \gamma_{j+k}) g(\gamma_{j+k}) \quad (3)$$

where $g(\gamma_{j+k})$ represents a weight function centered at sample coordinate $\gamma_j$; and $g(\gamma_{j+k})=0$ for j+k≤0.

Figure 9A:
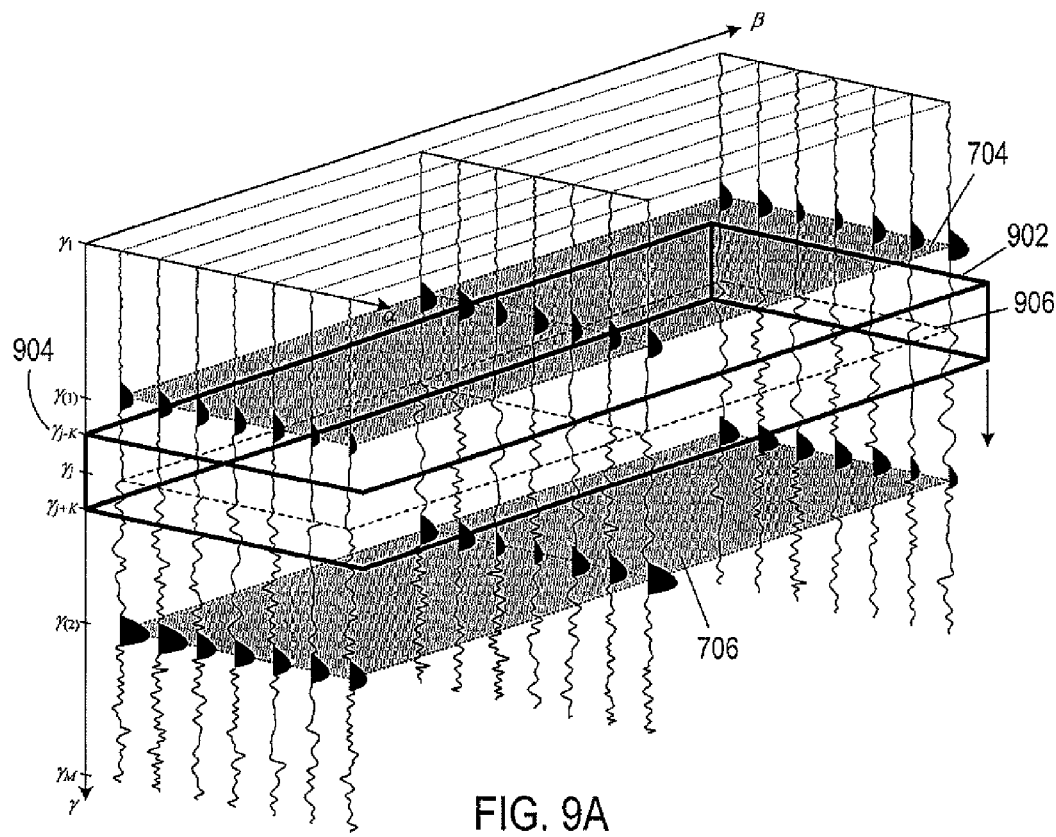
FIGS. 9A-9C show an example of calculating a smoothed-amplitude gather from an image gather.
Figure 9B:
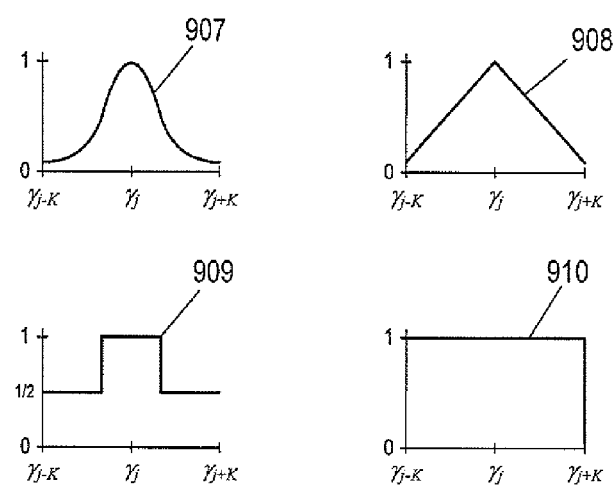
Figure 9C:
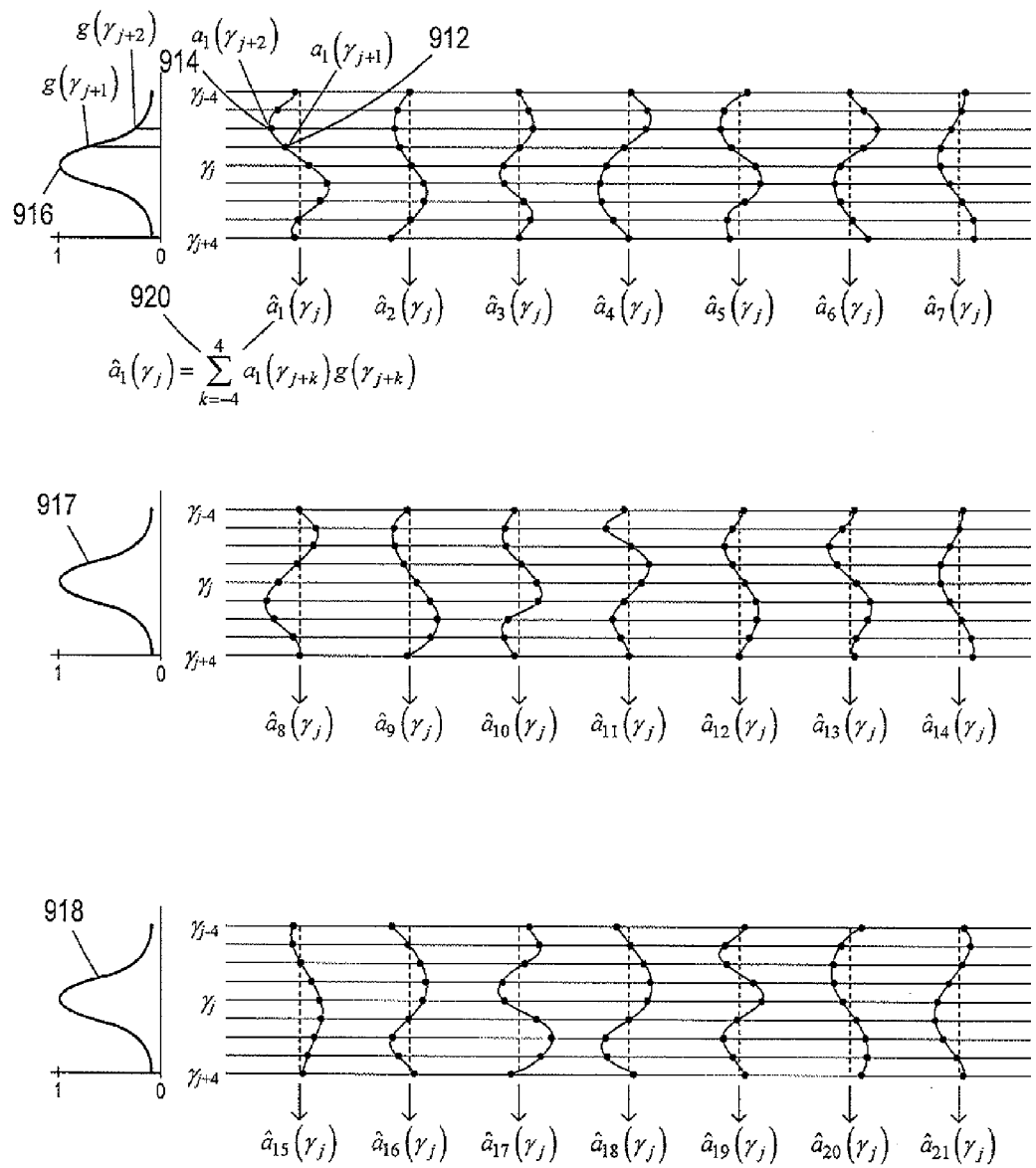

FIGS. 9A-9C illustrate calculation of the smoothed-amplitude gather 804 from the gather 700. FIG. 9A shows a snapshot of the gather 700 smoothed above sample coordinate $\gamma_j$ according to Equation (3). In FIG. 9A, a box 902 with bold edges conceptually represents a sliding window centered at sample coordinate $\gamma_j$ 904 represented by a plane 906. The sliding window 902 represents the collection of amplitudes of the 21 traces with sample coordinates that lie between $\gamma_{j-K} \leq \gamma_j \leq \gamma_{j+K}$. The snapshot of FIG. 9A, shows the sliding window 902 located at sample coordinate $\gamma_j$ after having started at sample coordinate $\gamma_1$. Amplitudes with sample coordinates in the interval $[\gamma_1, \gamma_j]$ are smoothed according to Equation (3) and correspond to smoothed amplitudes in the smoothed-amplitude gather 802 while amplitudes with sample coordinates in the interval $[\gamma_{j+1},\gamma_M]$ correspond to amplitudes in the gather 700, which have not yet been smoothed according to Equation (3).

FIG. 9B shows four examples of weight functions $g(\gamma_j)$ represented by curves 907-910 that may be used to generate smoothed amplitudes of a smoothed-gather. Each weight function is centered at sample coordinate $\gamma_j$. Curve 907 represents a Gaussian-shaped weight function; curve 908 represents a triangular-weight function; curve 909 represents a step-weight function; and curve 910 represents a box-weight function. The weight functions shown in FIG. 9B are not intended to be exhaustive of the weight functions that may be used to smooth gather amplitudes. Examples of other weight functions that may be used to smooth gather amplitudes include, but are not limited to, a cosine-weight function and a logistic-weight function.

FIG. 9C shows an example collection of amplitudes of 21 traces that lie between $\gamma_{j-4} \leq \gamma_j \leq \gamma_{j+4}$ of a sliding window. Dots represent sampled amplitudes, such as dots 912 and 914 that represent the amplitudes $a_1(\alpha,\beta,\gamma_{j+1})$ and $a_1(\alpha,\beta,\gamma_{j+2})$ of a trace tr(1). In this example, a Gaussian-weight function represented by curves 916-918 is applied to the amplitudes of each trace between $\gamma_{j-4} \leq \gamma_j \leq \gamma_{j+4}$. Smoothed amplitudes $\hat{a}_1(\alpha,\beta,\gamma_j) \ldots \hat{a}_{21}(\alpha,\beta,\gamma_j)$ are calculated separately for each of the 21 traces according to Equation (3) for amplitudes that lie between $\gamma_{j-4} \leq \gamma_j \leq \gamma_{j+4}$. For example, summation 920 represents calculation of smoothed amplitude $\hat{a}_1(\alpha,\beta,\gamma_j)$ of the trace tr(1) at sample coordinate $\gamma_j$ according to Equation (3) for K equal to 4.

SWS applied to the gather 700 described above with reference to FIGS. 7-8 represents a case in which the gather 700 has horizontal reflector planes. However, in general, SWS may be applied to unmigrated gather with non-horizontal reflectors. In cases where the gather has non-horizontal reflectors, SWS may be formulated to take into account the non-horizontal orientation and/or shape of the reflectors to generate a noise-reduced trace. SWS applied to a gather with one or more non-horizontal reflectors may be implemented as follows. The gather may have L non-horizontal reflectors that may each be represented by $\gamma^{(l)}(\alpha,\beta)$, where l is an integer non-horizontal reflector index that ranges from 1 to L. The non-horizontal reflectors $\gamma^{(l)}(\alpha,\beta)$ have the property that $\gamma^{(l)}(\alpha^*,\beta^*)=\gamma_{(l)}$, where $(\alpha^*,\beta^*,\gamma_{(l)})$ are coordinates of the non-horizontal reflector $\gamma^{(l)}(\alpha,\beta)$ intersection with a central axis of the gather. For amplitudes that lie in non-horizontal reflectors $\gamma^{(l)}(\alpha,\beta)$, self-weighted stacking may be applied as follows:

$$a_{SWS\_g}(\alpha, \beta, \gamma_{(l)}) = \frac{\sum_{i=1}^{N} \hat{a}_i^n(\alpha, \beta, \gamma^{(l)}(\alpha, \beta)) \cdot a_i(\alpha, \beta, \gamma^{(l)}(\alpha, \beta))}{\sum_{i=1}^{N} \hat{a}_i^n(\alpha, \beta, \gamma^{(l)}(\alpha, \beta))} \quad (4)$$

where $a_i(\alpha,\beta,\gamma^{(l)}(\alpha,\beta))$ represents an amplitude of a trace i with coordinates that lie in a non-horizontal reflector $\gamma^{(l)}(\alpha,\beta)$ of the gather; and $\hat{a}_i(\alpha,\beta,\gamma^{(l)}(\alpha,\beta))$ represents a smoothed amplitude of a trace i with coordinates that lie in the non-horizontal reflector $\gamma^{(l)}(\alpha,\beta)$ of the smoothed gather.

Amplitudes of a resulting noise-reduced gather that are not in smoothed wavelets calculated according to Equation (4) are assigned zero values.

Figure 10:
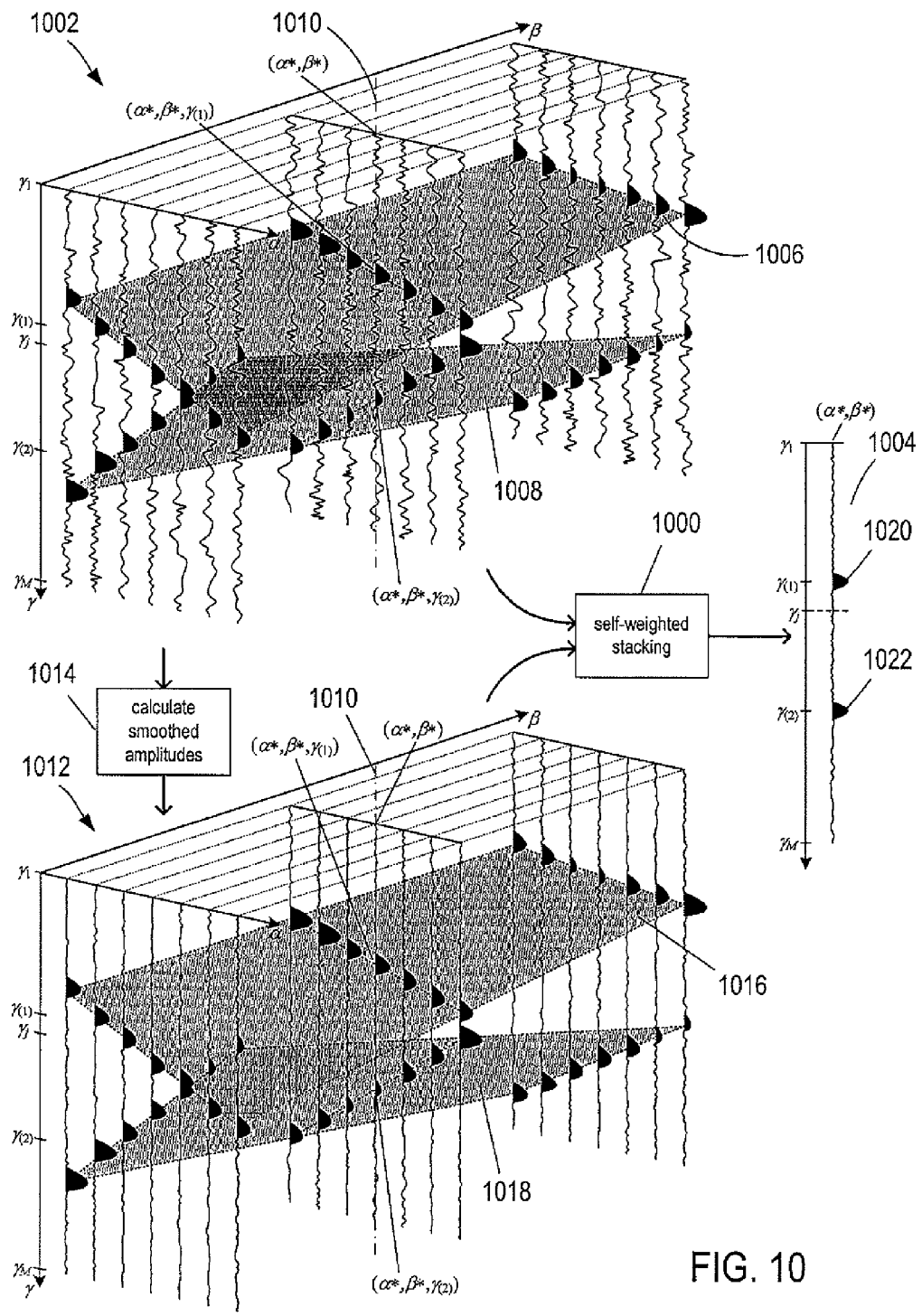
FIG. 10 shows an example of applying self-weighted stacking to an image gather with slanted reflectors.

FIG. 10 shows an example of applying SWS 1000 to an unmigrated gather 1002 with slanted reflector planes to generate a single noise-reduced trace 1004. The gather 1002 has a central axis 1010 located at central coordinates $(\alpha^*,\beta^*)$. The slanted reflector plane 1006 intersects the central axis 1010 at coordinates $(\alpha^*,\beta^*,\gamma_{(1)})$ and the slanted reflector plane 1008 intersects the central axis 1010 at coordinates $(\alpha^*,\beta^*,\gamma_{(2)})$. The sample coordinate of any point that lies in a slanted reflector plane may be represented by a plane parametric equation. For example, a mathematical representation of sample coordinates of the slanted reflector plane 1006 is a plane parametric equation:

$$\gamma^{(1)}(\alpha,\beta)=\gamma_{(1)}+p_\alpha^{(1)}\alpha+p_\beta^{(1)}\beta \quad (5a)$$

where $-\alpha_{max} \leq \alpha \leq \alpha_{max}$;
$-\beta_{max} \leq \beta \leq \beta_{max}$;
$p_\alpha^{(1)}$ represents the slope in the $\alpha$ coordinate direction; and
$p_\beta^{(1)}$ represents the slope in the $\beta$ coordinate direction.

A mathematical representation of sample coordinates of the slanted reflector plane $\gamma^{(2)}$ 1008 may be given by a plane parametric equation:

$$\gamma^{(2)}(\alpha,\beta)=\gamma_{(1)}+p_\alpha^{(2)}\alpha+p_\beta^{(2)}\beta \quad (5b)$$

where $-\alpha_{max} \leq \alpha \leq \alpha_{max}$;
$-\beta_{max} \leq \beta \leq \beta_{max}$;
$p_\alpha^{(2)}$ represents the slope in the $\alpha$ coordinate direction; and
$p_\beta^{(2)}$ represents the slope in the $\beta$ coordinate direction.

FIG. 10 also shows a smoothed-gather 1012 calculated 1014 from the gather 1002 using Equation (3) as described above with reference to FIGS. 9A-9C. The smoothed-gather 1012 includes slanted reflector planes 1016 and 1018 that intersect the central axis 1010 at coordinates $(\alpha^*,\beta^*,\gamma_{(1)})$ and $(\alpha^*,\beta^*,\gamma_{(2)})$. The slanted reflector planes 1016 and 1018 have the same orientation as corresponding slanted reflector planes 1006 and 1008 of the gather 1002. The slanted reflector planes 1016 and 1018 may also be mathematically represented by the same plane parametric Equations (5a) and (5b) as the slanted reflector planes 1006 and 1008.

SWS 1000 receives the gather 1002 and smoothed-gather 1012 as input and takes into account the slanted reflector planes according to Equations (5a) and (5b) to generate the noise-reduced trace 1004. The central coordinates $(\alpha^*,\beta^*)$ of the gather 1002 are the spatial coordinates of the noise-reduced trace 1004. The noise-reduced trace 1004 includes two wavelets 1020 and 1022 centered at sample coordinates $\gamma_{(1)}$ and $\gamma_{(2)}$, respectively. The self-weighted stack amplitudes that form the wavelet 1020 are calculated according to Equation (4) using the wavelet amplitudes $a_i(\alpha,\beta,\gamma_j)$ in the gather 1002 and the corresponding smoothed wavelet amplitudes $\hat{a}_i(\alpha,\beta,\gamma_j)$ in the gather 1012 with coordinates that lie in the slanted reflector planes represented by Equation (5a). The self-weighted stack amplitudes that form the wavelet 1022 are calculated according to Equation (4) using the amplitudes $a_i(\alpha,\beta,\gamma_j)$ in the gather 1002 and the corresponding smoothed amplitudes $\hat{a}_i(\alpha,\beta,\gamma_j)$ in the gather 1014 with coordinates that lie in the slanted reflector plane represented by Equation (5b). Amplitudes of the noise-reduced gather 1004 that are not in the wavelets 1020 and 1022 are assigned a zero value.

Figure 11:
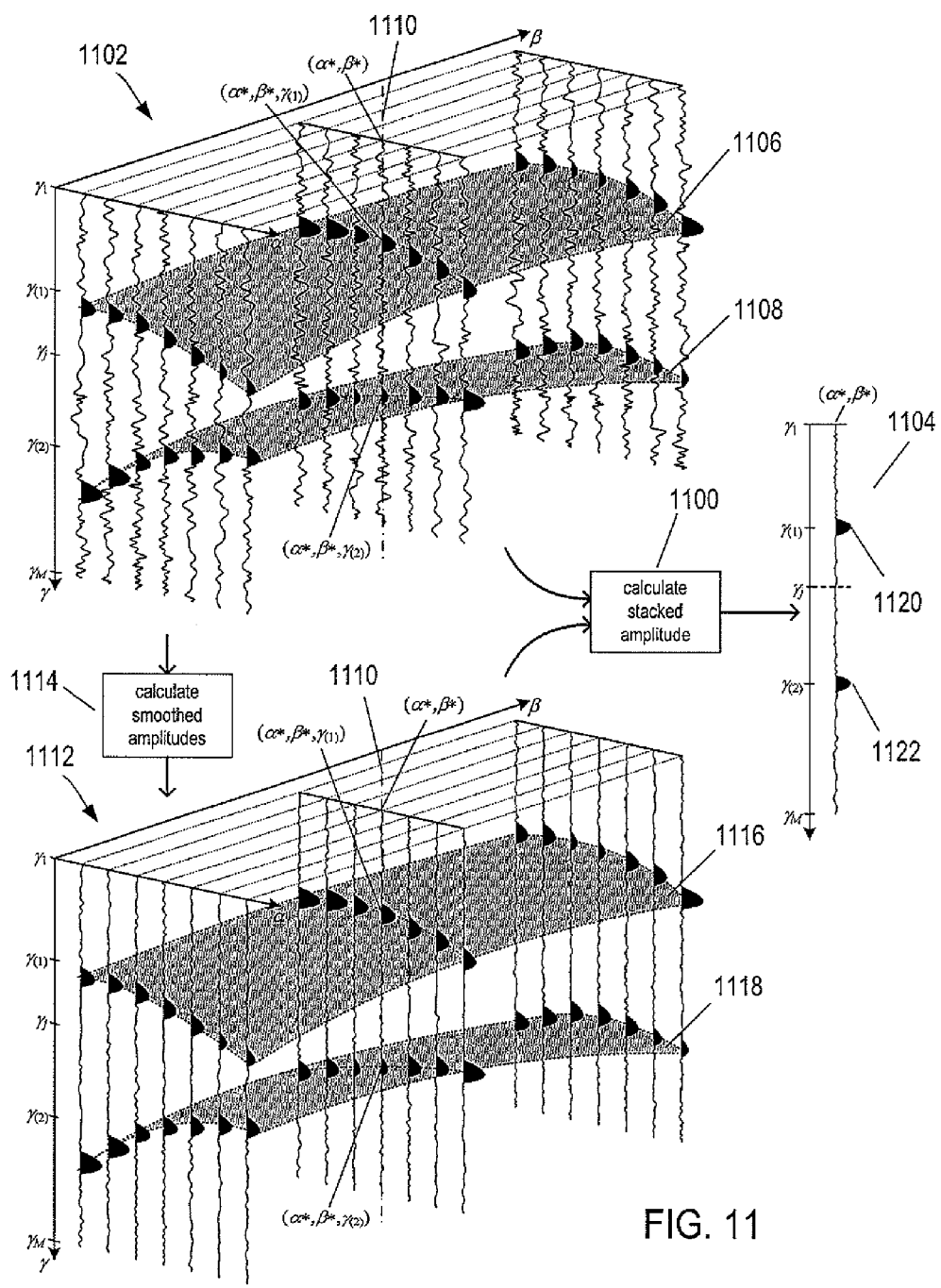
FIG. 11 shows an example of applying self-weighted stacking to an image gather with curved reflectors.

FIG. 11 shows an example of applying SWS 1100 to an unmigrated gather 1102 with curved reflectors to generate a single noise-reduced trace 1104. The gather 1102 has a central axis 1110 located at central coordinates $(\alpha^*,\beta^*)$. The curved reflector 1106 intersects the central axis 1110 at coordinates $(\alpha^*,\beta^*,\gamma_{(1)})$ and the curved reflector 1108 intersects the central axis 1110 at coordinates $(\alpha^*,\beta^*,\gamma_{(2)})$. The sample coordinate of any point that lies in a curved reflector may be represented by a curved parametric equation. For example, in one implementation, a mathematical representation of the curved reflector 1106 may be given by a first parabolic parametric equation:

$$\gamma^{(1)}(\alpha,\beta)=\gamma_{(1)}+q_\alpha^{(1)}\alpha^2+q_\beta^{(1)}\beta^2 \qquad (6a)$$

where $-\alpha_{max} \leq \alpha \leq \alpha_{max}$;
$-\beta_{max} \leq \beta \leq \beta_{max}$;
$q_\alpha^{(1)}$ represents the curvature in the α coordinate direction; and
$q_\beta^{(1)}$ represents the curvature in the β coordinate direction.

A mathematical representation of the curved reflector $\gamma^{(2)}$ 1108 may be given by a second parabolic parametric equation:

$$\gamma^{(2)}(\alpha,\beta)=\gamma_{(2)}+q_\alpha^{(2)}\alpha^2+q_\beta^{(2)}\beta^2 \qquad (6b)$$

where $-\alpha_{max} \leq \alpha \leq \alpha_{max}$;
$-\beta_{max} \leq \beta \leq \beta_{max}$;
$q_\alpha^{(2)}$ represents the curvature in the α coordinate direction; and
$q_\beta^{(2)}$ represents the curvature in the β coordinate direction.

FIG. 11 also shows a smoothed-gather 1112 calculated 1114 from the gather 1102 using Equation (3) as described above with reference to FIGS. 9A-9C. The smoothed-gather 1112 includes curved reflectors 1116 and 1118 that intersect the central axis 1110 at coordinates $(\alpha^*,\beta^*,\gamma_{(1)})$ and $(\alpha^*,\beta^*,\gamma_{(2)})$. The curved reflectors 1116 and 1118 correspond to the curved reflectors 1106 and 1108 of the gather 1102. The curved reflectors 1116 and 1118 may also be mathematically represented by the same curved parametric equations (5a) and (5b) as the curved reflectors 1106 and 1108.

SWS 1100 receives the gather 1102 and smoothed-gather 1112 as input and takes into account the curved reflectors of the gathers 1102 and 1112 using Equations (6a) and (6b) to generate the noise-reduced trace 1104. The central coordinates $(\alpha^*,\beta^*)$ of the gather 1102 are the spatial coordinates of the noise-reduced trace 1104. The noise-reduced trace 1104 includes two wavelets 1120 and 1122 centered at sample coordinates $\gamma_{(1)}$ and $\gamma_{(2)}$, respectively. For example, a self-weighted stack amplitude of the wavelet 1120 may be calculated according to Equation (4) using the amplitudes $a_i(\alpha,\beta,\gamma_j)$ in the gather 1102 and the corresponding smoothed amplitudes $\hat{a}_i(\alpha,\beta,\gamma_j)$ in the gather 1112 with coordinates that lie in the curved reflectors represented by Equation (6a). A self-weighted stack amplitude of the wavelet 1122 may be calculated according to Equation (4) using the amplitudes $a_i(\alpha,\beta,\gamma_j)$ in the gather 1102 and the corresponding smoothed amplitudes $\hat{a}_i(\alpha,\beta,\gamma_j)$ in the gather 1112 with coordinates that lie in the curved reflectors represented by Equation (6b). Amplitudes of the noise-reduced gather 1104 that are not in the wavelets 1120 and 1122 are assigned a zero value.

In another implementation, the mathematical equations used to represent the curved reflectors 1106 and 1108 in the gather 1102 are curved parametric equations:

$$\gamma^{(1)}(\alpha,\beta)=\sqrt{\gamma_{(1)}^2+(q_\alpha^{(1)})^2\alpha^2+(q_\beta^{(1)})^2\beta^2} \qquad (7a)$$

$$\gamma^{(2)}(\alpha,\beta)=\sqrt{\gamma_{(2)}^2+(q_\alpha^{(2)})^2\alpha^2+(q_\beta^{(2)})^2\beta^2} \qquad (7b)$$

Equations (7a) and (7b) may replace Equations (6a) and (6b), respectively, in calculating the noise-reduced trace 1104.

Figure 12:
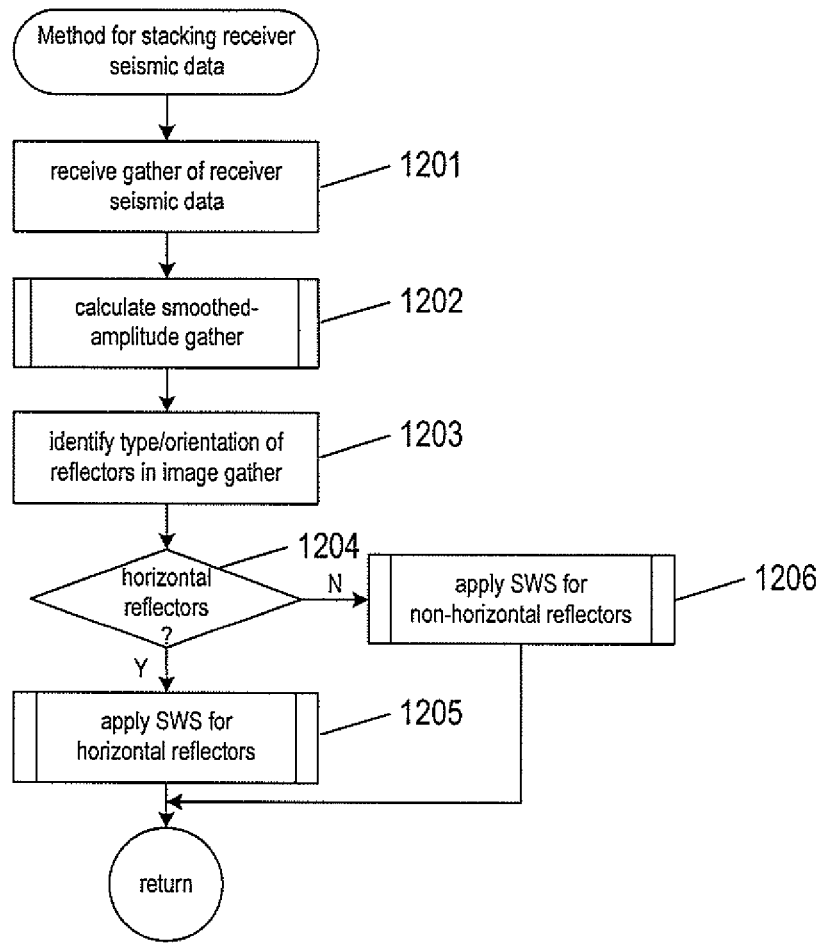
FIG. 12 shows a flow-control diagram of a method for stacking seismic data.

FIG. 12 shows a flow-control diagram of a method for stacking receiver seismic data. In block 1201, a gather with N traces of receiver seismic data measured by N receivers is received as input. The domain of the gather may depend on the survey acquisition geometry used to collect the seismic data. For example, the gather may be in the offset domain with x and y offset coordinates, the incidence-angle domain with incidence-angle coordinates, or an azimuth domain with azimuth coordinates. One or more seismic data processing techniques may have been applied to the seismic data prior to the seismic data being received as input in block 1201. For example, the seismic data received in block 1201 may already have been debubbled, denoised, regularized, and/or demultipled. The gather of seismic data may have undergone pre-stack migration followed by residual NMO to flatten reflectors. The pre-stack migration may be a time-dependent pre-stack migration technique or a depth-dependent pre-stack migration technique. Examples of pre-stack migration techniques include Kirchhoff migration, reverse-time migration, wavefield-extrapolation migration, and reverse-time migration. As a result, the gather may be an ODCIG, ADCIG, or ASCIG. Alternatively, the gather of seismic data received in block 1201 may be raw unmigrated seismic data. In block 1202, a routine called "calculate smoothed-amplitude gather" is called to generate a smoothed-amplitude gather of the gather received in block 1201, as described above with reference to FIGS. 8-11. In block 1203, the type and orientation of reflectors in the gather are identified. For example, the operation in block 1203 may identify horizontal reflectors, slanted reflectors, or curved reflectors, as described above with reference to FIGS. 7, 10, and 11. In decision block 1204, when the reflectors in the gather are identified as horizontal reflectors, control flows to block 1205. On the other hand, when the reflectors in the gather are identified as non-horizontal reflectors, control flows to block 1206. In block 1205, the image gather is stacked to generate a noise-reduced trace with coordinates that correspond to the center coordinates of the gather using horizontal self-weighted stacking with weights based on the amplitudes of the smoothed-amplitude gather, as described above with reference to Equations (2) and FIG. 8. Spatial coordinates of the noise-reduced trace generated in block 1205 are the central coordinates of the gather. In block 1206, a routine "calculate SWS for non-horizontal reflectors" is called to generate a noise-reduced trace using non-horizontal self-weighted stacking with coordinates that correspond to the center coordinates of the image gather and weights that are based on the amplitudes of the smoothed-amplitude gather, as described above with reference to Equation (4). Spatial coordinates of the noise-reduced trace generated in block 1206 are the central coordinates of the image gather.

Figure 13:
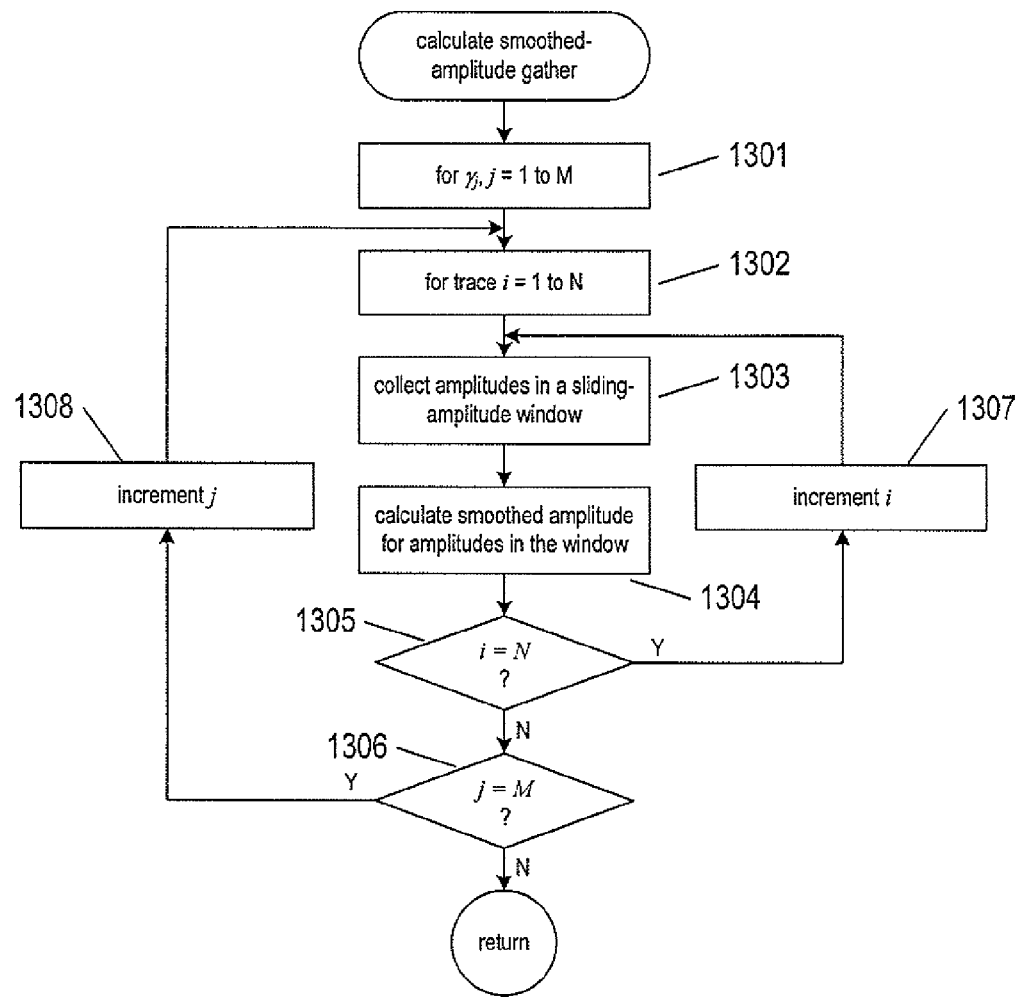
FIG. 13 shows a flow-control diagram of a method that represents a routine "calculate smoothed-amplitude gather" called in block 1202 of FIG. 12.

FIG. 13 shows a flow-control diagram of a method that represents the routine "calculate smoothed-amplitude gather" called in block 1202 of FIG. 12. A for-loop beginning in block 1301 repeats the operations associated with blocks 1302-1306 for each sample coordinate $\gamma_j$ with sample coordinate integer index j ranging from 1 to M. A for-loop beginning in block 1302 repeats the operations associated with blocks 1303-1305 for each trace in the gather with trace integer index i ranging from 1 to N. In block 1303, amplitudes of the gather that lie within a sliding-amplitude gather are collected, as described above with reference to FIG. 9A. In block 1304, a smoothed amplitude is calculated at sample coordinate $\gamma_j$ and trace i as described above with reference to Equation (3) and FIGS. 9B-9C. In decision block 1305, when all N traces have been considered (i.e., i=N) control flows to decision block 1306. Otherwise, in block 1307, the trace index i is incremented and the operations in blocks 1303-1305 are repeated. In decision block 1306, when all M sample indices have been considered (i.e., j=M) the routine stops and returns to the method in FIG. 12. Otherwise, control flows to block 1308 in which the sample coordinate index j is incremented and the operations in blocks 1302-1306 are repeated for another sample coordinate.

Figure 14:
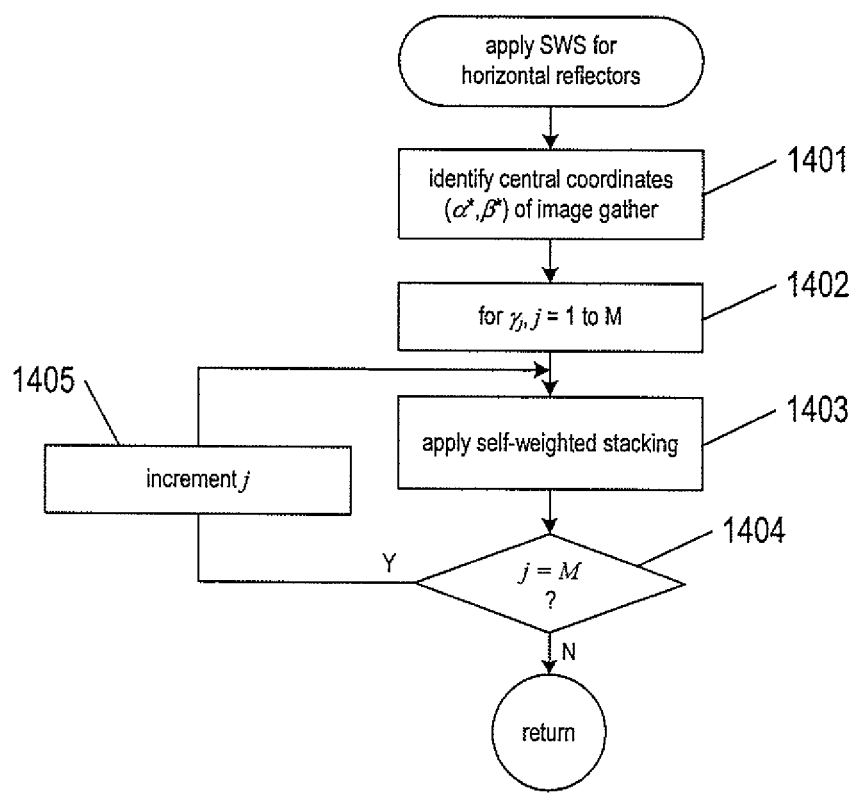
FIG. 14 shows a flow-control diagram of a method that represents a routine "calculate self-weighted stacking ("SWS") for horizontal reflectors" called in block 1205 of FIG. 14.

FIG. 14 shows a flow-control diagram of a method that represents the routine "apply SWS for horizontal reflectors" called in block 1205 of FIG. 12. In block 1401, central coordinates $(\alpha^*,\beta^*)$ of the gather are identified. A for-loop beginning in block 1402 repeats the operations represented blocks 1403-1405 for each sample coordinate $\gamma_j$ with sample coordinate integer index j ranging from 1 to M. In block 1403, self-weighted stacking is applied to amplitudes with sample coordinates $\gamma_j$ (i.e., lie in the same horizontal sample plane with respect to the coordinate plane), as described above with reference to self-weighted stacking in Equation (2) and FIG. 8. In decision block 1404, when all M sample coordinates have been considered (i.e., j=M) the method stops and returns to the method in FIG. 12. Otherwise, control flows to block 1405 in which the sample coordinate index j is incremented and the operations in blocks 1403-1404 are repeated for another sample coordinate.

Figure 15:
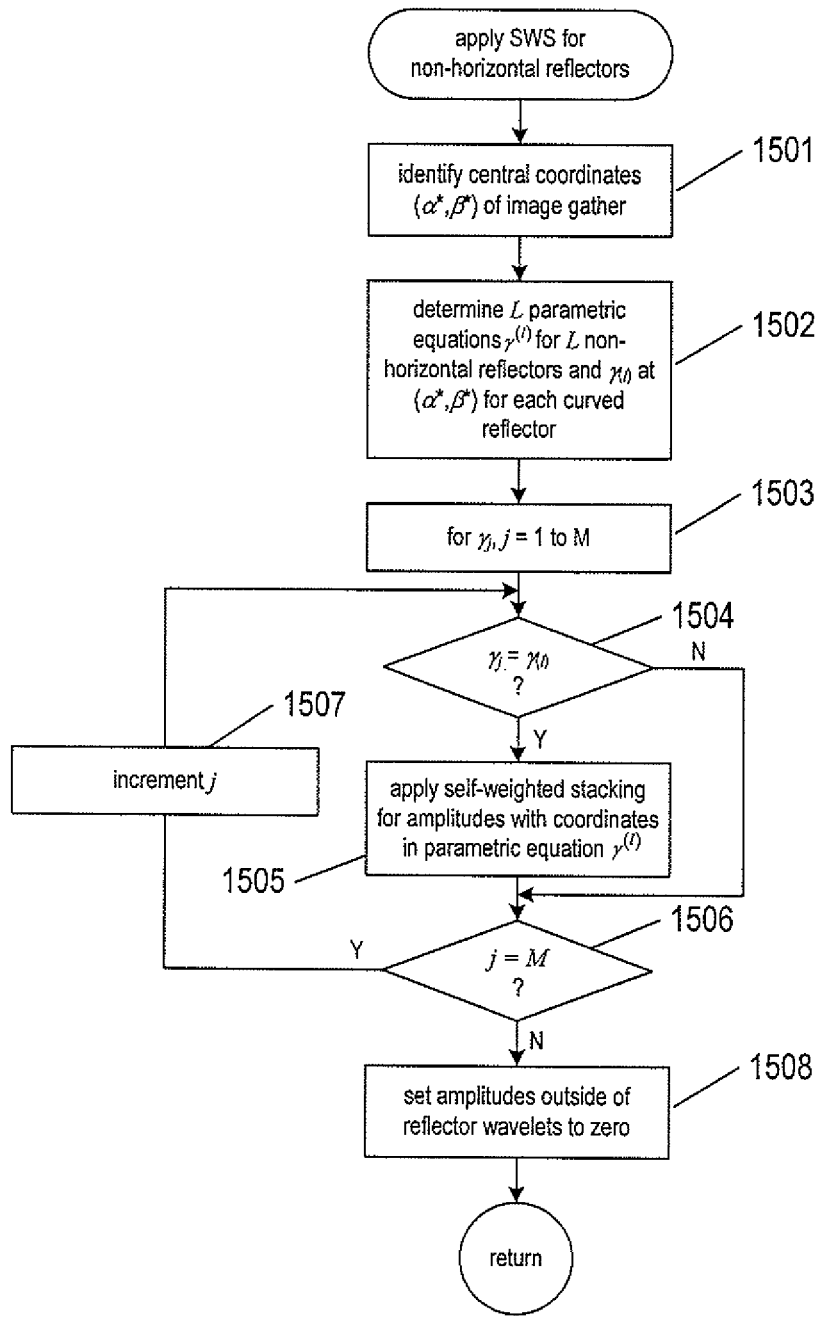
FIG. 15 shows a flow-control diagram of a method that represents a routine "calculate SWS for non-horizontal reflectors" called in block 1206 of FIG. 14.

FIG. 15 shows a flow-control diagram of a method that represents the routine "apply SWS for non-horizontal reflectors" called in block 1206 of FIG. 12. In block 1501, central coordinates $(\alpha^*,\beta^*)$ of the gather are identified. In block 1502, L parametric equations $\gamma^{(l)}(\alpha,\beta)$ that mathematically represent each of the L curved reflectors of the gather are determined by fitting parametric equations to the shape of the reflectors, as described above with reference to examples in FIGS. 10 and 11. The parametric equations are determined with the property that $\gamma^{(l)}(\alpha^*,\beta^*)=\gamma_{(l)}$, as described above with reference to slanted parametric Equations (5a)-(5b) and curved parametric Equations (6a)-(6b) and (7a)-(7b). A for-loop beginning in block 1503 repeats the operations represented blocks 1504-1508 for each sample coordinate $\gamma_j$ with sample coordinate integer index j ranging from 1 to M. In decision block 1504, when a sample coordinate $\gamma_j$ equals any one of the L sample coordinates $\gamma_{(l)}$, control flows to block 1505. Otherwise, when a sample coordinate $\gamma_j$ does not equal any one of the L sample coordinates $\gamma_{(l)}$, control flows to decision block 1506. In block 1505, self-weighted stacking is applied to amplitudes with coordinates that lie in the same curved reflector to generate smoothed amplitude wavelets in the noise-reduced trace, as described above with reference to self-weighted stacking in Equation (4) and FIGS. 10 and 11. In decision block 1506, when all M sample coordinates have been considered (i.e., j=M) the method stops and returns to the method in FIG. 12. Otherwise, control flows to block 1507 in which the sample coordinate index j is incremented and the operations in blocks 1504-1506 are repeated for another sample coordinate. In block 1508, amplitudes of the noise-reduced trace with coordinates $\gamma_j$ that do not lie in a non-horizontal reflector (i.e., between wavelets) are assigned a zero value.

Figure 16:
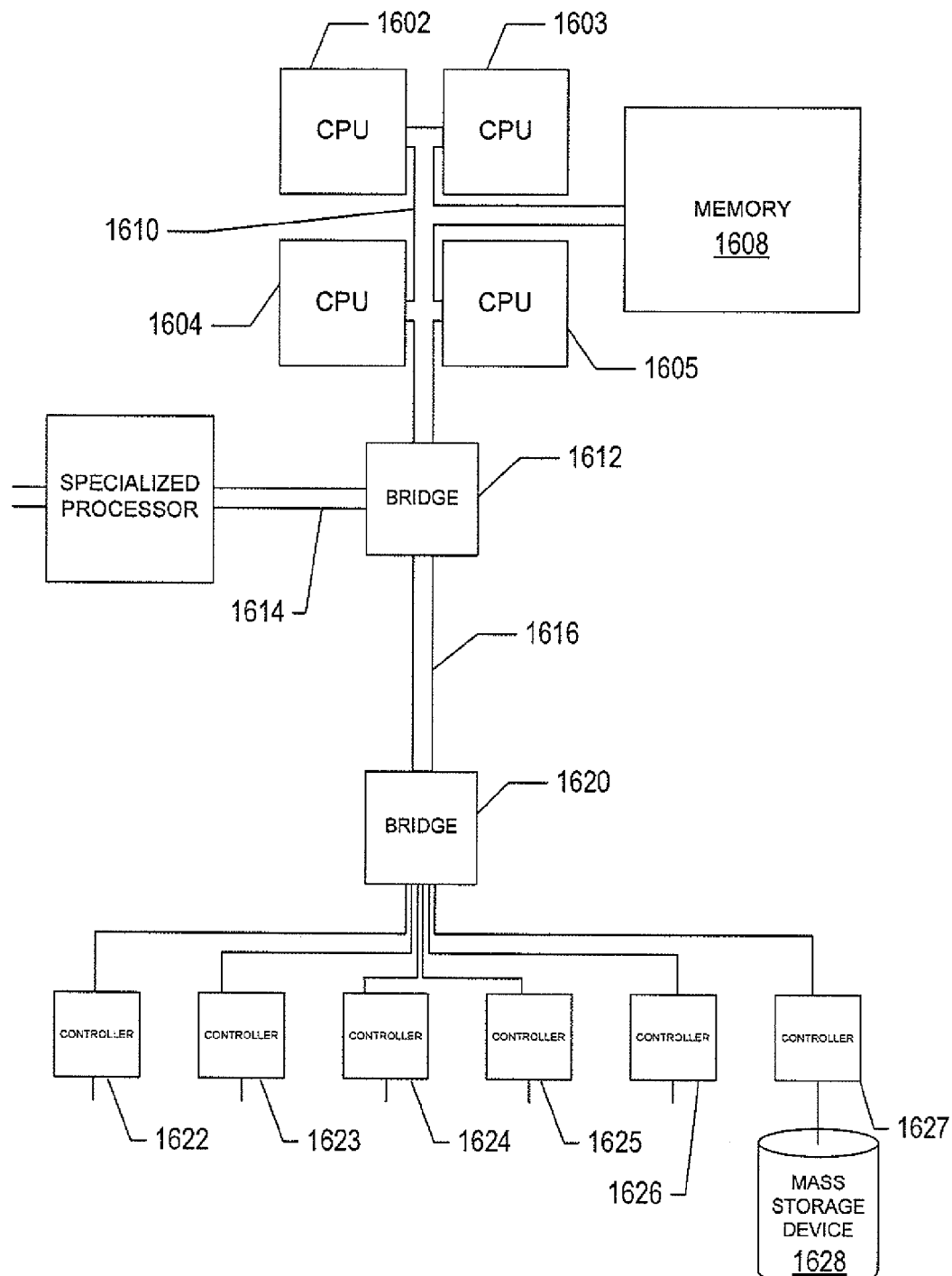
FIG. 16 shows an example of a generalized computer system that executes efficient methods for performing self-weighted stacking of seismic data.

FIG. 16 shows an example of a generalized computer system that executes efficient methods for performing SWS of seismic data as described above and therefore represents a geophysical-analysis data-processing system. Performing SWS on such a computer system improves processing of seismic data to generate seismic images of an actual surveyed subterranean formations for the following reasons. SWS is a fully automatic stacking technique in that user intervention or control is not required, SWS does not require a priori information about the magnitude distribution of trace amplitudes of the image gather traces, and SWS does not require a priori computation of model traces or thresholds. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 1602-1605, one or more electronic memories 1608 interconnected with the CPUs by a CPU/memory-subsystem bus 1610 or multiple busses, a first bridge 1612 that interconnects the CPU/memory-subsystem bus 1610 with additional busses 1614 and 1616, or other types of high-speed interconnection media, including multiple, high-speed serial interconnects. The busses or serial interconnections, in turn, connect the CPUs and memory with specialized processors, such as a graphics processor 1618, and with one or more additional bridges 1620, which are interconnected with high-speed serial links or with multiple controllers 1622-1627, such as controller 1627, that provide access to various different types of computer-readable media, such as computer-readable medium 1628, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1628 is a data-storage device, including electronic memory, optical or magnetic disk drive, USB drive, flash memory and other such data-storage device. The computer-readable medium 1628 can be used to store machine-readable instructions that encode the computational methods described above and can be used to store encoded data, during store operations, and from which encoded data can be retrieved, during read operations, by computer systems, data-storage systems, and peripheral devices.

Although the above disclosure has been described in terms of particular implementations, it is not intended that the disclosure be limited to these implementations. Modifications within the spirit of this disclosure will be apparent to those skilled in the art. For example, any of a variety of different implementations of SWS can be obtained by varying any of many different design and development parameters, including programming language, underlying operating system, modular organization, control structures, data structures, and other such design and development parameters.

The method described above may be implemented in real time while a survey is being conducted or subsequent to completion of the survey. The noise-reduced traces produced by SWS as described above form a geophysical data product indicative of certain properties of a subterranean formation. The geophysical data product may include processed seismic geophysical data and may be stored on a computer-readable medium as described above. The geophysical data product may be produced offshore (i.e. by equipment on survey vessel 102) or onshore (i.e. at a computing facility on land) either within the United States or in another country. When the geophysical data product is produced offshore or in another country, it may be imported onshore to a data-storage facility in the United States. Once onshore in the United States, geophysical analysis may be performed on the data product.

It is appreciated that the previous description of the disclosed embodiments is provided to enable any person skilled in the art to make or use the present disclosure.

Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method to generate an image of a subterranean formation, the method comprising:
 receiving a gather of receiver seismic data generated by receivers of a seismic data acquisition system;
 smoothing amplitudes of each trace of the gather of receiver seismic data to generate a smoothed-amplitude gather, the smoothed-amplitude gather having smoothed-amplitude traces, each smoothed-amplitude trace corresponding to a trace of the gather of receiver seismic data;
 stacking the traces of the gather of receiver seismic data to generate a noise-reduced trace, wherein each amplitude of the noise-reduced trace is calculated as a sum of amplitudes of the traces of the gather of receiver seismic data weighted by smoothed amplitudes of corresponding smoothed-amplitude traces of the smoothed-amplitude gather; and
 generating an image of the subterranean formation based at least in part on the noise-reduced traces, the image revealing subsurface structural information about the subterranean formation.

2. The method of claim 1, wherein calculating the smoothed-amplitude gather further comprises for each sample coordinate of the gather,
 centering a sliding window on the sample coordinate, the sliding window containing amplitudes of each trace in the gather; and
 for each trace, calculating a smoothed amplitude at the sample coordinate as a weighted sum of amplitudes of the trace within the sliding window.

3. The method of claim 1, wherein stacking traces of the gather to generate the noise-reduced trace further comprises identifying reflectors of the gather as one of horizontal and non-horizontal.

4. The method of claim 3 further comprising when the reflectors are identified as horizontal, for each sample coordinate, calculating an amplitude of the noise-reduced trace as a summation of each amplitude of the gather multiplied by a corresponding smoothed amplitude of the smoothed-amplitude gather raised to a power, the summation divided by a sum of smoothed amplitudes of the smoothed-amplitude gather at the same sampled coordinate, each smoothed amplitude raised to the power.

5. The method of claim 3 further comprising when the reflectors are identified as non-horizontal,
 for each sample coordinate that corresponds to a central spatial coordinate in a non-horizontal reflector,
 calculating an amplitude of the noise-reduced trace as a summation of each amplitude with spatial coordinates that lie in the non-horizontal reflector multiplied by a corresponding smoothed amplitude of the smoothed-amplitude gather raised to a power that lie in the non-horizontal reflector of the corresponding smoothed-amplitude gather, the summation divided by a sum of smoothed amplitudes of the smoothed-amplitude gather that lie the non-horizontal reflector, each smoothed amplitude raised to the power; and
 for each sample coordinate that does not have corresponding spatial coordinates in one of the non-horizontal reflectors, setting the amplitude to zero in the noise-reduced trace.

6. The method of claim 1 executed on a programmable computer programmed to perform the method.

7. The method of claim 1 further comprises storing the noise-reduced traces in one or more data-storage devices.

8. The method of claim 1, wherein the noise-reduced traces form a geophysical data product, further comprising recording the geophysical data product on a physical, non-volatile computer-readable medium suitable for importing onshore.

9. The method of claim 8, further comprising performing geophysical analysis onshore on the geophysical data product.

10. A computer system to generate an image of a subterranean formation, the system comprising:
 one or more processors;
 one or more data-storage devices; and
 a routine stored in one or more of data-storage devices and executed by the one or more processors, the routine directed to
 retrieving seismic data generated by receivers of a seismic data acquisition system from the one or more data-storage devices;
 smoothing amplitudes of each trace of the gather of receiver seismic data to generate a smoothed-amplitude gather, the smoothed-amplitude gather having smoothed-amplitude traces, each smoothed-amplitude trace corresponding to a trace of the gather of receiver seismic data;
 stacking the traces of the gather of receiver seismic data to generate a noise-reduced trace, wherein each amplitude of the noise-reduced trace is calculated as a sum of amplitudes of the traces of the gather of receiver seismic data weighted by smoothed amplitudes of corresponding smoothed-amplitude traces of the smoothed-amplitude gather; and
 generating an image of the subterranean formation based at least in part on the noise-reduced traces, the image revealing subsurface structural information about the subterranean formation.

11. The system of claim 10, wherein calculating the smoothed-amplitude gather further comprises for each sample coordinate of the gather,
 centering a sliding window on the sample coordinate, the sliding window containing amplitudes of each trace in the gather; and
 for each trace, calculating a smoothed amplitude at the sample coordinate as a weighted sum of amplitudes of the trace within the sliding window.

12. The system of claim 10, wherein stacking traces of the gather to generate the noise-reduced trace further comprises identifying reflectors of the gather as one of horizontal and non-horizontal.

13. The system of claim 12 further comprising when the reflectors are identified as horizontal, for each sample coordinate, calculating an amplitude of the noise-reduced trace as a summation of each amplitude of the gather multiplied by a corresponding smoothed amplitude of the smoothed-amplitude gather raised to a power, the summation divided by a sum of smoothed amplitudes of the smoothed-amplitude gather at the same sampled coordinate, each smoothed amplitude raised to the power.

14. The system of claim 12 further comprising when the reflectors are identified as non-horizontal,
for each sample coordinate that corresponds to a central spatial coordinate in a non-horizontal reflector,
calculating an amplitude of the noise-reduced trace as a summation of each amplitude with spatial coordinates that lie in the non-horizontal reflector multiplied by a corresponding smoothed amplitude of the smoothed-amplitude gather raised to a power that lie in the non-horizontal reflector of the corresponding smoothed-amplitude gather, the summation divided by a sum of smoothed amplitudes of the smoothed-amplitude gather that lie the non-horizontal reflector, each smoothed amplitude raised to the power; and
for each sample coordinate that does not have corresponding spatial coordinates in one of the non-horizontal reflectors, setting the amplitude to zero in the noise-reduced trace.

15. The system of claim 10 executed on a programmable computer programmed to perform the method.

16. The system of claim 10 further comprises storing the noise-reduced traces in one or more data-storage devices.

17. The system of claim 10, wherein the noise-reduced traces form a geophysical data product, further comprising recording the geophysical data product on a physical, non-volatile computer-readable medium suitable for importing onshore.

18. The system of claim 17, further comprising performing geophysical analysis onshore on the geophysical data product.

19. A non-transitory computer-readable medium having machine-readable instructions encoded thereon for enabling one or more processors of a computer system to perform the operations of
retrieving seismic data generated by receivers of a seismic data acquisition system from the one or more data-storage devices;
smoothing amplitudes of each trace of the gather of receiver seismic data to generate a smoothed-amplitude gather, the smoothed-amplitude gather having smoothed-amplitude traces, each smoothed-amplitude trace corresponding to a trace of the gather of receiver seismic data;
stacking the traces of the gather of receiver seismic data to generate a noise-reduced trace, wherein each amplitude of the noise-reduced trace is calculated as a sum of amplitudes of the traces of the gather of receiver seismic data weighted by smoothed amplitudes of corresponding smoothed-amplitude traces of the smoothed-amplitude gather; and
generating an image of the subterranean formation based at least in part on the noise-reduced traces, the image revealing subsurface structural information about the subterranean formation.

20. The computer-readable medium of claim 19, wherein calculating the smoothed-amplitude gather further comprises for each sample coordinate of the gather,
centering a sliding window on the sample coordinate, the sliding window containing amplitudes of each trace in the gather; and
for each trace, calculating a smoothed amplitude at the sample coordinate as a weighted sum of amplitudes of the trace within the sliding window.

21. The computer-readable medium of claim 19, wherein stacking traces of the gather to generate the noise-reduced trace further comprises identifying reflectors of the gather as one of horizontal and non-horizontal.

22. The computer-readable medium of claim 21 further comprising when the reflectors are identified as horizontal, for each sample coordinate, calculating an amplitude of the noise-reduced trace as a summation of each amplitude of the gather multiplied by a corresponding smoothed amplitude of the smoothed-amplitude gather raised to a power, the summation divided by a sum of smoothed amplitudes of the smoothed-amplitude gather at the same sampled coordinate, each smoothed amplitude raised to the power.

23. The computer-readable medium of claim 21 further comprising when the reflectors are identified as non-horizontal,
for each sample coordinate that corresponds to a central spatial coordinate in a non-horizontal reflector,
calculating an amplitude of the noise-reduced trace as a summation of each amplitude with spatial coordinates that lie in the non-horizontal reflector multiplied by a corresponding smoothed amplitude of the smoothed-amplitude gather raised to a power that lie in the non-horizontal reflector of the corresponding smoothed-amplitude gather, the summation divided by a sum of smoothed amplitudes of the smoothed-amplitude gather that lie the non-horizontal reflector, each smoothed amplitude raised to the power; and
for each sample coordinate that does not have corresponding spatial coordinates in one of the non-horizontal reflectors, setting the amplitude to zero in the noise-reduced trace.

24. The computer-readable medium of claim 19 executed on a programmable computer programmed to perform the method.

25. The computer-readable medium of claim 19 further comprises storing the noise-reduced traces in one or more data-storage devices.

26. The computer-readable medium of claim 19, wherein the noise-reduced traces form a geophysical data product, further comprising recording the geophysical data product on a physical, non-volatile computer-readable medium suitable for importing onshore.

27. The computer-readable medium of claim 26, further comprising performing geophysical analysis onshore on the geophysical data product.

* * * * *